US008104085B2

(12) United States Patent
Fresko et al.

(10) Patent No.: US 8,104,085 B2
(45) Date of Patent: Jan. 24, 2012

(54) HYBRID SYSTEM IMPLEMENTING DISTINCT AND CO-EXISTING APPLICATION EXECUTION ENVIRONMENTS AND METHODS FOR IMPLEMENTING THE SAME

(75) Inventors: Nedim Fresko, San Francisco, CA (US); Richard D. Tuck, San Francisco, CA (US); Dean R. E. Long, Boulder Creek, CA (US)

(73) Assignee: Oracle America, Inc., Redwood City, CA (US)

( * ) Notice: Subject to any disclaimer, the term of this patent is extended or adjusted under 35 U.S.C. 154(b) by 1382 days.

(21) Appl. No.: 10/877,410

(22) Filed: Jun. 24, 2004

(65) Prior Publication Data

US 2004/0267804 A1 Dec. 30, 2004

Related U.S. Application Data

(60) Provisional application No. 60/483,543, filed on Jun. 27, 2003.

(51) Int. Cl.
*G06F 12/00* (2006.01)
*G06F 12/14* (2006.01)
*G06F 13/00* (2006.01)
*G06F 9/44* (2006.01)

(52) U.S. Cl. ............ 726/21; 718/1; 717/127; 717/162; 717/163; 717/165; 717/166; 719/328; 726/26

(58) Field of Classification Search .......... 717/166
See application file for complete search history.

(56) References Cited

U.S. PATENT DOCUMENTS

| 4,545,016 A | * | 10/1985 | Berger | 711/202 |
|---|---|---|---|---|
| 5,058,164 A | * | 10/1991 | Elmer et al. | 713/190 |
| 5,805,880 A | * | 9/1998 | Pearce et al. | 713/2 |
| 5,987,506 A | * | 11/1999 | Carter et al. | 709/213 |
| 6,028,847 A | * | 2/2000 | Beanland | 370/252 |
| 6,192,477 B1 | * | 2/2001 | Corthell | 726/11 |

(Continued)

FOREIGN PATENT DOCUMENTS

GB 2 365 554 A 2/2002

(Continued)

OTHER PUBLICATIONS

Lee, Young-Min.; Tak, Byung-Chul.; Maeng, Hye-Seon.; Kim, Shin-Dug. "Real-Time Java Virtual Machine for Information Applicances". IEEE Transactions on Consumer Electronics. vol. 46, Issue 04. Pub. Date: Nov. 2000. Relevant pp. 949-957. Found on the World Wide Web at: http://ieeexplore.ieee.org/stamp/stamp/jsp?tp=arnumber=920445.*

(Continued)

*Primary Examiner* — Nathan Flynn
*Assistant Examiner* — Jeremiah Avery
(74) *Attorney, Agent, or Firm* — Martine Penilla Group, LLP

(57) ABSTRACT

A hybrid system is provided. The system includes a computing device implementing a first application execution environment (AEE) and a second AEE. The first AEE is configured to be isolated from the second AEE. The first software application associated with the first AEE is configured to be processed on the first AEE such that the first software application is denied direct access to the second AEE. A second software application associated with the second AEE is configured to be processed on the second AEE such that the second software application is denied direct access to the first AEE.

32 Claims, 11 Drawing Sheets

U.S. PATENT DOCUMENTS

| | | | |
|---|---|---|---|
| 6,199,181 B1 * | 3/2001 | Rechef et al. | 714/38 |
| 6,374,286 B1 * | 4/2002 | Gee et al. | 718/108 |
| 6,507,904 B1 * | 1/2003 | Ellison et al. | 712/229 |
| 6,604,167 B1 * | 8/2003 | Blandy et al. | 711/100 |
| 6,678,712 B1 * | 1/2004 | McLaren et al. | 718/100 |
| 6,678,825 B1 * | 1/2004 | Ellison et al. | 726/17 |
| 6,691,230 B1 * | 2/2004 | Bardon | 726/27 |
| 6,968,540 B2 * | 11/2005 | Beck et al. | 717/130 |
| 6,976,254 B2 * | 12/2005 | Kramskoy | 718/1 |
| 6,996,748 B2 * | 2/2006 | Uhlig et al. | 714/38.13 |
| 7,191,440 B2 * | 3/2007 | Cota-Robles et al. | 718/1 |
| 7,272,832 B2 * | 9/2007 | Gardner | 718/105 |
| 7,278,030 B1 * | 10/2007 | Chen et al. | 713/189 |
| 7,412,702 B1 * | 8/2008 | Nelson et al. | 718/1 |
| 7,480,806 B2 * | 1/2009 | Grawrock | 713/189 |
| 2003/0135748 A1 * | 7/2003 | Yamada et al. | 713/193 |
| 2003/0159070 A1 * | 8/2003 | Mayer et al. | 713/201 |
| 2004/0093517 A1 * | 5/2004 | Cihula | 713/201 |
| 2004/0103407 A1 * | 5/2004 | Blaukopf et al. | 717/140 |

FOREIGN PATENT DOCUMENTS

| | | |
|---|---|---|
| WO | WO 00/52572 | 9/2000 |
| WO | WO 01/40900 A2 | 6/2001 |

OTHER PUBLICATIONS

Beck, et al., "OS/2 Version 2.0—vol. 2: DOS and Windows Environment", *IBM Corporation*, Boca Raton, US, vol. 2, pp. 1-82, XP002173368, (1992).

Piroumian, "Introduction to the Java 2 Micro Edition (J2ME) Platform", *Online!*, pp. 1-14, XP002303409, URL:http://www.developer.com/ws/j2me/article.php/1475521 (2002).

* cited by examiner

US 8,104,085 B2

HYBRID SYSTEM IMPLEMENTING DISTINCT AND CO-EXISTING APPLICATION EXECUTION ENVIRONMENTS AND METHODS FOR IMPLEMENTING THE SAME

CROSS REFERENCE TO RELATED APPLICATIONS

This application claims priority from U.S. Provisional Patent Application No. 60/483,543, filed on Jun. 27, 2003, and entitled "HYBRID SYSTEM IMPLEMENTING ISOLATED AND CO-EXISTING PROFILES AND METHODS FOR IMPLEMENTING THE SAME" by Fresko et al., which is incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to computing devices, and more particularly, to computing devices implementing isolated and co-existing Application Execution Environments.

2. Description of the Related Art

As is well known, new technologies are being continually developed, supplying consumers with extra features, capabilities, and services. To meet the requirements of the new technologies and/or to accommodate the newly added features, capabilities, or services, new computing devices executing new software applications may need to be developed. While the new features, capabilities, and services of the new technologies can be used by consumers using the advanced computing devices executing the new software applications, the new features, capabilities, and services may not be supported by computing devices unable to meet the requirements of the new technologies (e.g. running a different software application, thus providing different capabilities). The consumers, however, aspire to utilize the new features, capabilities, and services provided by the new technologies on computing devices failing to meet the requirements of the new technologies. While taking advantage of the new technologies, however, the consumers do not wish to sacrifice any of the capabilities and services originally provided by the computing devices failing to meet the requirements of the new technologies, which at the present time is unachievable.

In view of the foregoing, a need therefore exists in the art for systems and methods implementing the same wherein isolated application execution environments having diverse capabilities can co-exist on a same computing device.

SUMMARY

Embodiments of the present invention provide systems and methods wherein distinct application execution environments (AEE) can co-exist on a same computing device. It should be appreciated that the present invention can be implemented in numerous ways, including as a process, an apparatus, a system, a device, or a method. Several inventive embodiments of the present invention are described below.

In one embodiment, a system for implementing isolated application execution environments on a computing device is provided. The system includes means for providing the computing device to include a first environment and a second environment, means for initiating execution of a second software application on the second environment, and means for denying the second software application direct access to the first environment while the second software application is being executed. The first environment is configured to have greater capabilities than the second environment.

In another embodiment, a hybrid system is provided. The system includes a computing device implementing a first application execution environment (AEE) and a second AEE. The first AEE is configured to be isolated from the second AEE. The first software application associated with the first AEE is configured to be processed on the first AEE such that the first software application is denied direct access to the second AEE. A second software application associated with the second AEE is configured to be processed on the second AEE such that the second software application is denied direct access to the first AEE.

In still another embodiment, a system for maintaining a multi-application execution environment is provided. The system includes a computing device that implements an alpha environment and a plurality of beta environments. The alpha environment is configured to have an alpha capability. Each beta environment of the plurality of beta environments is configured to have an associated beta capability. The alpha environment is configured to be isolated from each beta environment of the plurality of beta environments. An alpha software application associated with the alpha environment is configured to be processed on the alpha environment such that the alpha software application is denied direct access to each beta environment of the plurality of beta environments. Each beta software application associated with each beta environment of the plurality of beta environments is configured to be processed on the associated beta environment of the plurality of beta environments such that the beta software application is denied direct access to the alpha environment. Each beta software application of each beta environment of the plurality of beta environments is configured to be denied direct access to non-associated beta environments.

In yet another embodiment, a method for implementing isolated application execution environments on a computing device is provided. The method includes providing the computing device including a first environment and a second environment, initiating execution of a second software application on the second environment, and denying the second software application direct access to the first environment while the second software application is being executed. The first environment is configured to have greater capabilities than the second environment.

In still another embodiment, a method for a Mobile Information Device Profile (MIDP) application execution environment and a Connected Device Configuration (CDC) environment to co-exist on a computing device is provided. The method includes providing the computing device including the MIDP environment and the CDC environment, executing a MIDlet on the MIDP environment, and denying the MIDlet direct access to the CDC environment while the MIDlet is being executed. The CDC environment is configured to have greater capabilities than the MIDP environment.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1A:
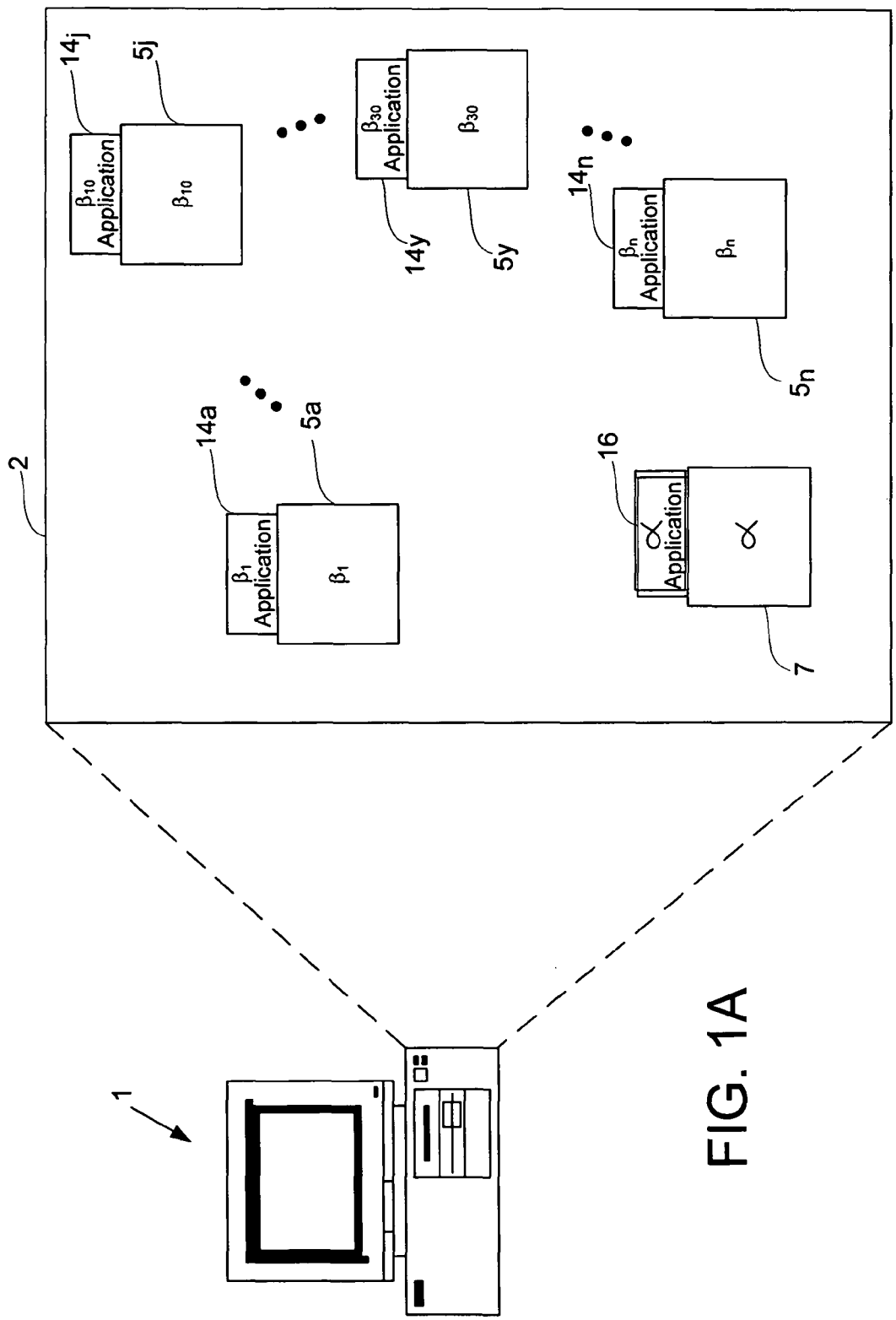
FIG. 1A depicts a simplified block diagram of a computing device implementing the hybrid system of the present invention, in accordance with one embodiment of the present invention.

Inventions for hybrid systems including co-existing yet isolated application execution environments (herein after referred to as "environment" or "AEE") and methods for implementing the same are provided. In one embodiment, a less capable environment, hereinafter referred to as "beta environment" co-exists with a most capable environment, hereinafter referred to as "alpha environment" on a computing device. The alpha environment is configured to have more capabilities than the beta environment such that software applications associated with the alpha environment are prevented from directly accessing the beta environment, and software applications associated with the beta environment are prevented from directly accessing the alpha environment. In one example, the hybrid system of the present invention denies direct access to the alpha environment by rejecting beta environment request for alpha environment-only capabilities. In another example, when accessing the capabilities included in the alpha and beta environments, the hybrid system of the present invention denies the beta environment access to the alpha environment by restricting the accessibility of the beta environment to the capabilities of the beta environment.

As used herein, a capability is defined as one or more resources available to the environment (e.g., libraries, interfaces, functionalities, methods, classes, Java properties, static variables of the classes, files, network connections, etc.). The more capable environment, as used herein, refers to the environment providing the broadest set of resources In another example, a classloader that is a subclass of a user-defined classloader is instantiated, thus creating a namespace in Java. Thereafter, a software application running on top of the beta environment is initiated sending a request to load a class to the classloader. In this manner, every request for a class is directed through the same instance of the classloader. Furthermore every request on behalf of the class is guided through the same classloader instance of the class.

If the new classloader is not capable of processing the request issued by the software application, the issued request is sent to yet another classloader (also a subclass of the user-defined classloader) configured to load the beta environment class library. Delegating the request from the beta software application to the immediate parent is continued until the request is sent to alpha environment "System ClassLoader". Thereafter, the result of loading the class is sent to the alpha environment running on top of the hardware.

According to one embodiment, the alpha environment (the most capable environment) and a plurality of beta environments (less capable environments) can co-exist on the computing device with the alpha environment being capable of supporting each beta environment of the plurality of environments, each being less capable than the alpha environment. In one instance, co-existing but distinct environments can be implemented to prevent direct access to any environment from any Java 2 capable environment, and from any environment to the Java 2 capable environment.

In another embodiment, each of the beta environments can be built on top of the alpha environment as well as all the various environments associated with the alpha environment. The alpha environment as well as all the various environments associated with same is hidden from direct calls generated by the software applications associated with each of the beta environments. In the same manner, each of the beta environments is hidden from direct calls generated by the software applications associated with the alpha environment. Additionally, each of the beta environments is hidden from calls generated by the software applications associated with each of the remaining beta environments.

In one exemplary embodiment, a Mobile Information Device Profile (MIDP) environment (i.e., the less capable environment) can co-exist with a Connected Device Configuration (CDC) environment (i.e., the more capable environment) or any of the various environments associated with the CDC environment. In such exemplary embodiment, the CDC environment is hidden from all direct calls by MIDP applications (MIDlets) while the MIDP environment is hidden from all direct calls by CDC applications. In one example, hiding the MIDP environment from the CDC environment and the CDC environment from the MIDP environment is achieved by using a combination of classloaders and imposition of limitations. In one instance, a classloader subclass MIDletClassLoader is instantiated for each MIDlet such that each of the class requests by the MIDlet goes through the MIDletClassLoader classloader. In the same manner, all of the classes referenced by the requested class are also guided through the same instance of the MIDletClassLoader. If the MIDlet request for the class requested cannot be satisfied by the MIDletClassLoader classloader, the request for the class is delegated to the immediate parent of the MIDletClassLoader.

According to one embodiment, if the MIDlet requests a class that is outside of the MIDlet domain, the MIDletClassLoader rejects the request and instigates an exception. In a different embodiment, the MIDlet request can be for a class that exists both in MIDP and in CDC, with the MIDP version being a subset of the CDC. In such a scenario, once the MIDletClassLoader loads a class of the MIDlet, the MIDletClassLoader traverses the constant pool of the class to determine whether the class has direct access to any "forbidden members" (i.e., members included in CDC but not in MIDP). According to one example, every time the class is defined, the constant pool is traversed in search of forbidden members. If the class includes a forbidden member, the request for the class or the class is rejected. In yet another embodiment, the MIDlet requests a class with a method that contains floating-point byte codes. In one example, the request for loading of the class by the MIDlet can be denied at classloading time. In another example, the request for execution of the floating-point byte codes generates a run-time exception. Several exemplary embodiments of the invention will now be described in detail with reference to the accompanying drawings.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

I. Environment Description—Java™ 2 Enterprise Edition, Platform, Java 2 Desktop Edition, Java 2 Micro Edition, Platform and Java As embodiments of the present invention can implement the J2EE or J2ME, a brief introduction to J2ME and J2EE architectures are provided below. The Java 2, Micro Edition (J2ME) platform is a Java platform for consumer and embedded devices such as mobile phones, Personal Digital Assistants (PDAs), TV set-top boxes, in-vehicle telematic systems, and a broad range of embedded devices. Similar to the enterprise (J2EE), desktop (J2SE™) and smart card (Java Card™) counterparts, the J2ME platform is a set of standard Java application program interfaces (APIs) defined through the Java Community Processss$^{SM}$ program by expert groups that include leading device manufacturers, software vendors and service providers.

The J2ME platform delivers the power and benefits of Java technology tailored for consumer and embedded devices. The J2ME provides a flexible user interface, robust security model, broad range of built-in network protocols, and support for networked and disconnected applications. J2ME applications are written for a wide range of devices. As such, the J2ME applications can be downloaded dynamically and leverage each native capability of each device. The J2ME platform can be deployed on millions of devices (e.g., mobile phones, PDAs, automotive devices, etc.) supported by leading Java technology tools vendors and used by companies worldwide. Briefly stated, J2ME is the preferable platform for consumer and embedded devices.

The J2ME architecture defines configurations, environments and optional packages as elements for building complete Java runtime environments that meet the requirements for a broad range of devices and target markets. Each combination is optimized for the memory, processing power, and I/O capabilities of a related category of devices. The result is a common Java platform that fully leverages each type of device to deliver a rich user experience.

Configurations

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC), and the Connected Device Configuration (CDC):

CLDC

CLDC is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the Java platform implementation and the associated applications.

CDC

CDC is designed for devices having more memory, faster processors, and greater network bandwidth (e.g., TV set-top boxes, residential gateways, in-vehicle telematics systems, high-end PDAs, etc.). CDC includes a full-featured Java virtual machine, and a much larger subset of the J2SE platform than CLDC. As a result, most CDC-targeted devices have 32-bit CPUs and a minimum of 2 MB of memory available for the Java platform and associated applications.

Environments

In order to provide a complete runtime environment targeted at specific device categories, configurations can be combined with a set of higher level APIs or environments that further define the application life cycle model, the user interface, and access to device specific properties.

Mobile Information Device Profile:

The Mobile Information Device Profile (MIDP) is designed for mobile phones and entry-level PDAs. MIDP is a set of Java APIs which, together with CLDC, provides a complete J2ME application runtime environment targeted at mobile information devices, such as mobile phones and entry level PDAs. In this manner, MIDP offers the core application functionality required by mobile applications (e.g., the user interface, network connectivity, local data storage, and application management, etc.). Combined with CLDC, MIDP provides a substantially complete Java runtime environment that leverages the capabilities of handheld devices and minimizes both memory and power consumption.

Currently, CLDC, combined with the MIDP is the Java runtime environment for mobile information devices (MIDs) (e.g., phones, entry level PDAs, etc.). MIDP provides the core application functionality required by mobile applications (e.g., the user interface, network connectivity, local data storage, and application lifecycle management packaged as a standardized Java runtime environment and set of Java APIs, etc.).

Foundation Profile

CDC Profiles are layered so that profiles can be added as needed to provide application functionality for different types of devices. The Foundation Profile (FP) is the lowest level Profile for CDC and provides a network-capable implementation of CDC that can be used for deeply embedded implementations without a user interface. FP can also be combined with Personal Basis Profile and Personal Profile for devices that require a graphical user interface (GUI).

Personal Profile

The Personal Profile (PP) is the CDC environment aimed at devices requiring full GUI or Internet applet support (e.g., high-end PDAs, communicator-type devices, game consoles, etc.). PP includes the full Java Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

Personal Basis Profile:

The Personal Basis Profile (PBP), is a subset of PP. PBP provides an application environment for network connected devices that support a basic level of graphical presentation or require the use of specialized graphical toolkits for specific applications. Devices (e.g., TV set-top boxes, in-vehicle telematics systems, information kiosks, etc.) Both PP and PBP are layered on top of CDC and FP.

A computing device including a combination of a configuration (e.g., the CLDC) and an environment (e.g., MIDP) is configured to implement a set of application profile interface (API) associated with the combination. By preventing the use of APIs not associated with the combination, fragmentation of the platform can be achieved.

As J2EE, J2SE, and J2ME all use the Java™ Virtual Machine (hereinafter JVM), an overview of the latter is herein provided. The JVM is an abstract computing machine. Similar to other computing machines, the JVM has an instruction set and manipulates various memory areas at run time. For instance, the JVM may not assume any particular implementation technology, host (i.e., underlying platform) hardware, or host operating system. Furthermore, JVM may not be inherently interpreted, however, the JVM can be implemented by compiling the JVM instruction set to that of the host CPU. The JVM may also be implemented in microcode or directly in hardware.

The JVM knows does not know of the Java™ programming language. Rather, the JVM knows of a class file format, which is a particular binary format. A class file contains JVM instructions (i.e., byte codes), a symbol table (i.e., a constant pool), and other ancillary information. A class file is produced by the Java compiler and can be loaded into any JVM. Furthermore, a class file is usually stored on disk or is accessed by way of a network connection. For additional information on Java™ programming language and JVM reference should be made to "The Java™ Virtual Machine Specification," by Lindholm and Yellin, Addison Wesley, second edition.

The JVM can also dynamically load classes needed by a running application, supporting dynamic loading of software components on the Java platform. The JVM uses classloaders to load class files and create class objects defined in Java code. For instance, the classloaders are instances of subclasses of a class ClassLoader. The ClassLoader is a subsystem responsible for locating the appropriate file, copying the appropriate file into the memory, and making the file useful as a part of a running application. In one embodiment, multiple classloaders can exist on a JVM at the same time. The classloaders can be arranged in a hierarchy such that a classloader can forward a classloading request to the parent classloader of the class.

By way of example, when an initial class is loaded by a classloader, the classloader is defined as the class defining classloader. As a result, the JVM will use the specific classloader to load almost all classes referenced by the initial class. In this manner, for the JVM to create an object of a class referenced by the initial class, the virtual machine is configured to first resolve the referenced class. For instance, if the referenced class has not been loaded, the JVM is configured to load the referenced class using the classloader. Once a referenced class has been loaded, the JVM can resolve the reference to the referenced class and then create the object associated with the referenced class.

According to one embodiment, a Java application may use several different kinds of classloaders to manage various software components. Classloaders can be user-defined classloaders or system classloaders that are supplied by the JVM. User-defined classloaders can be used to create classes originating from user-defined sources (e.g., a browser application). Most system classes (such as java.lang.String) are loaded into the system classloader and are supported directly by the JVM.

A user-defined classloader further can specify the remote location from which a class can be loaded. User-defined classloaders can also assign appropriate security attributes to classes that are loaded from a certain source. For more information on classloaders, reference should be made to a paper entitled "Dynamic Class Loading in the Java™ Virtual Machine," by Sheng Liang and Gilad Bracha, dated October 1998.

II. Hybrid System Implementing Co-Existing Yet Isolated Application Execution Environments Keeping the overviews to J2EE, J2SE, J2ME, Java, classloaders, and user-defined classloaders in mind, reference is made to a simplified block diagram shown in FIG. 1A depicting a computing device 1 implementing the hybrid system, in accordance with one embodiment of the present invention. A plurality of isolated beta1-$beta_n$ application execution environments (hereinafter referred to as "environment" or "AEE") 5a-$5_n$ are shown to be co-existing with an alpha environment 7 in a storage 2 of a computing device 1. An alpha application 16 sits on top of the alpha environment 7 and is executed by the alpha environment 7 while beta1-$beta_n$ applications 14a-14n sit on top of associated beta1-$beta_n$ environments 5a-$5_n$, and are configured to be executed on associated beta1-$beta_n$ environments 5a-$5_n$. In one embodiment, each of the beta1-$beta_n$ environments 5a-$5_n$ is configured to be related to the alpha environment (e.g., have similar architectures, etc.). In the embodiment of FIG. 1A, the alpha environment 7 has the most capabilities. By way of example, a core set of libraries for the alpha environment 7 has been recognized to be broader than core set of libraries corresponding to each of the beta1-$beta_n$ environments 5a-$5_n$.

In accordance with one embodiment, each beta application of the beta1-$beta_n$ applications 14a-14n is given the illusion that each application is being executed on the associated beta1-$beta_n$ environment 5a-$5_n$ solely. However, in reality, the computing device 1 has the capability to perform more complex and complicated functions because of including the alpha environment 7 capable of executing more complicated and complex alpha applications 16 executed on the alpha environment 7. One embodiment of the present invention provides such capability by preventing the beta1-$beta_n$ applications 14a-14n from directly accessing the alpha environment 7. In this manner, the alpha environment 7 (e.g., the most capable environment) of the hybrid system of the present invention provides compatibility for running beta1-beta$_n$ applications 14a-14n each of which expects to be executed on the corresponding beta1-beta$_n$ environment 5a-5$_n$. Nonetheless, one embodiment of the present invention may enable the entire capabilities of the alpha environment 7 available when each of the beta1-beta$_n$ environments 5a-5$_n$ is being implemented.

By way of example, the alpha environment 7 running on the computing device 1 in conjunction with beta1-beta$_n$ environments 5a-5$_n$ can provide the user of the computing device 1 with more capabilities, such as interfaces, functionalities, classes, etc. Barriers, however, are created so that each of the beta1-beta$_n$ applications 14a-14$_n$ has no knowledge of the existence of the alpha environment 7 or any of the remaining beta environments. Likewise, the alpha application 16 has no knowledge of the existence of the beta1-beta$_n$ environments 5a-5$_n$, and as such, cannot directly access any of the beta1-beta$_n$ environments 5a-5$_n$.

In accordance with one example, while beta1-beta$_n$ environments 5a-5$_n$ are less capable than the alpha environment 7, each of the beta1-beta$_n$ environments 5a-5$_n$ may include capabilities not present in the alpha environment. In one example, each pair of beta1-beta$_n$ environment 5a-5$_n$ and the alpha environment 7 can share code and implementation. In another embodiment, beta1-beta$_n$ environments 5a-5$_n$ can share code and implementation. Thus, in one embodiment of the present invention, the environments and the layers of the hybrid system can share code while respective applications of each environment are merely aware, and as such, can only interface with the associated environment, respectively.

In one exemplary embodiment, beta1-beta$_n$ environments 5a-5$_n$ are not aware of the alpha environment 7 as beta environments 5a-5$_n$ are denied direct access to the alpha environment by the hybrid system of present invention rejecting beta1-beta$_n$ environments 5a-5$_n$ requests for alpha environment-only capabilities. In another example, when accessing capabilities included in each pair of the alpha environment and beta environment, the hybrid system of the present invention denies beta environments access to the alpha environment by restricting the accessibility of the beta environments to associated capabilities. Additional information regarding the mechanism implemented to hide co-existing environments from one another is provided with respect to FIGS. 1B-8.

According to one embodiment of the present invention, an intersection may exist between the classes associated with the alpha environment 7 and classes associated with each of the beta1-beta$_n$ environments 5a-5$_n$. In such a scenario, each beta1-beta$_n$ environment 5a-5$_n$ in each pair of the alpha environment 7 and beta1-beta$_n$ environment 5a-5$_n$ may define a class member (e.g., field, member, etc.) not included in the alpha environment 7. In a different embodiment, however, an intersection may not exist between the classes associated with the alpha environment 7 and classes associated with each of the beta1-beta$_n$ environments 5a-5$_n$.

Figure 1B:
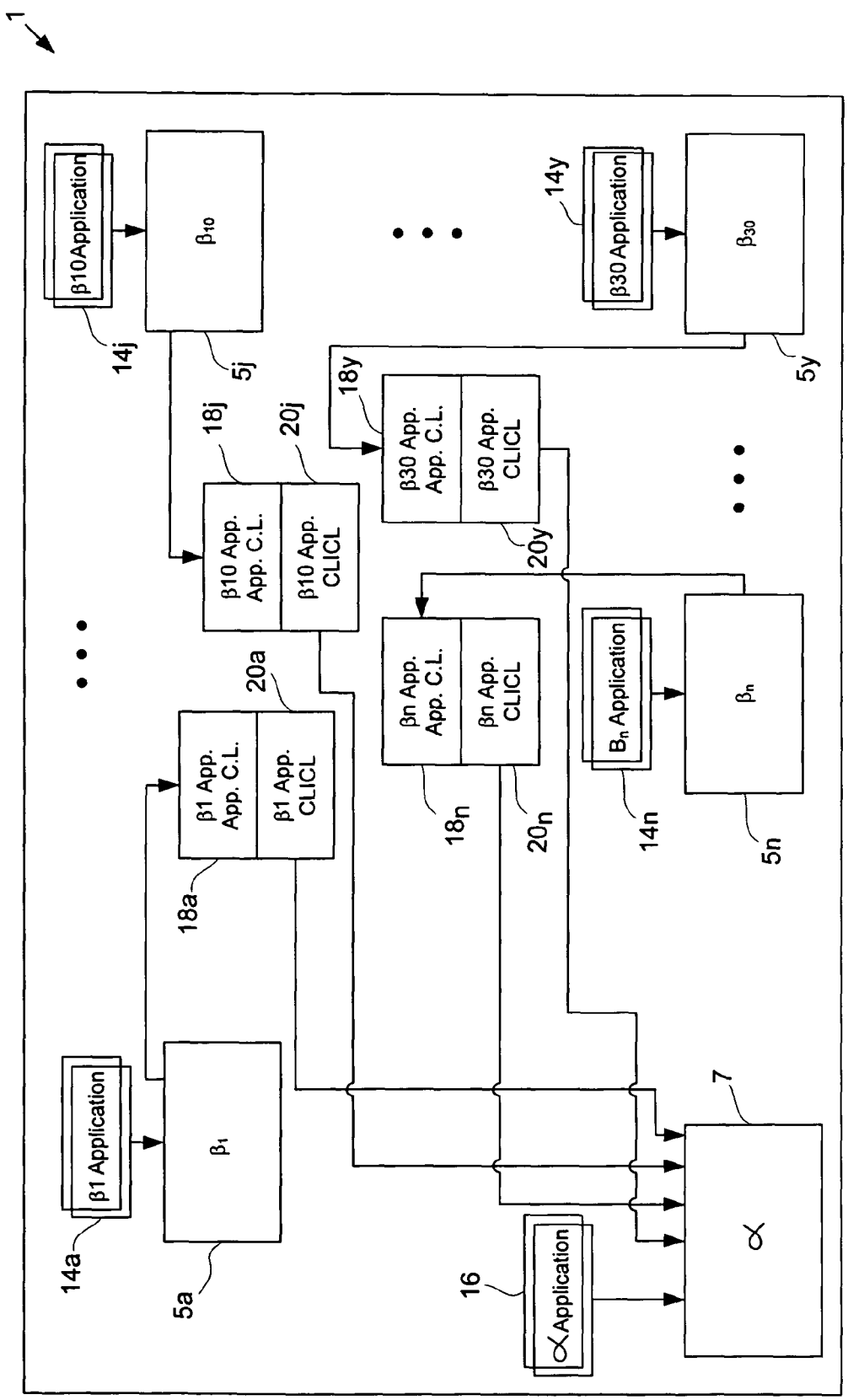
FIG. 1B depicts a simplified enlarged block diagram illustrating the execution of beta applications associated with a plurality of beta environments using the hybrid system of the present invention, in accordance with one embodiment of the present invention.

Proceeding to the simplified enlarged block diagram shown in FIG. 1B, execution of beta1-beta$_n$ applications 14a-14n on the associated beta1-beta$_n$ environments 5a-5$_n$ using the hybrid system, can further be understood, in accordance with one embodiment of the present invention. In one exemplary embodiment, the hybrid system of the present invention can include a pair of environments including a most capable environment (e.g., the alpha environment 7) and a less capable environment (e.g., the beta1 environment 5a) so as to give the beta application 14a the illusion of being run on the beta1 environment. In one embodiment, all classloaders implemented in the hybrid system are instantiated as the associated environment is being set up. Furthermore, a parent classloader of a classloader is instantiated before instantiating the child classloader. In one example, a CDC System ClassLoader is instantiated when the system is started. Thereafter, a CDCApplicationClassLoader is instantiated as part of setting up the CDC environment. Beta 1 ApplicationClassLibraryImplementationClassloader and Beta1Application ClassLoader are then successively instantiated as part of setting up the MIDP environment. According to one example, the Beta1 ApplicationClassLoader 18a is configured to be a subclass of a user-defined classloader ClassLoader. The user-defined Beta1ApplicationClassLoader 8 is configured to create a namespace in Java, and is configured to be responsible for loading each requested class as well as almost all the classes referenced by the requested class.

Loading the requested class is delegated to theBeta1ApplicationClassLibraryImplementationClassloader 20 if the request for the initial class cannot be processed by the Beta1ApplicationClassLoader 18a. In one example, the Beta1ApplicationClassLibraryImplementationClassloader 20a is designed to load the beta1 class library. Thereafter, processing the requested class is continued until concluded followed by sending the results to the alpha environment 7. It must be noted that delegating the request from beta1 application 14a to the immediate parent is continued until the request is sent to CDC System ClassLoader. According to one example, the Beta1Application ClassLibraryImplementationClassloader 20a may include a filter so as to reject the beta1 application 14a request to directly access the alpha environment 7.

Analogously, the alpha application 16 is shown to be sent directly to the alpha environment, thus preventing the alpha application 16 from discovering the existence of the beta1 environment 5a or any of the remaining beta2-beta$_n$ environments 5b-5$_n$. In the same manner, pairs of alpha environment 7 and beta2-beta$_n$ environments can be formed so as to give each of the beta applications 14b-14$_n$ the illusion of running on associated beta2-beta$_n$ environments while being able to use the extra capabilities provided by the alpha environment 7. As shown, each beta environment of beta2-beta$_n$ environments has an associated BetaApplicationClassLoader and BetaApplicationClassLibraryImplementationClassLoader.

Figure 2:
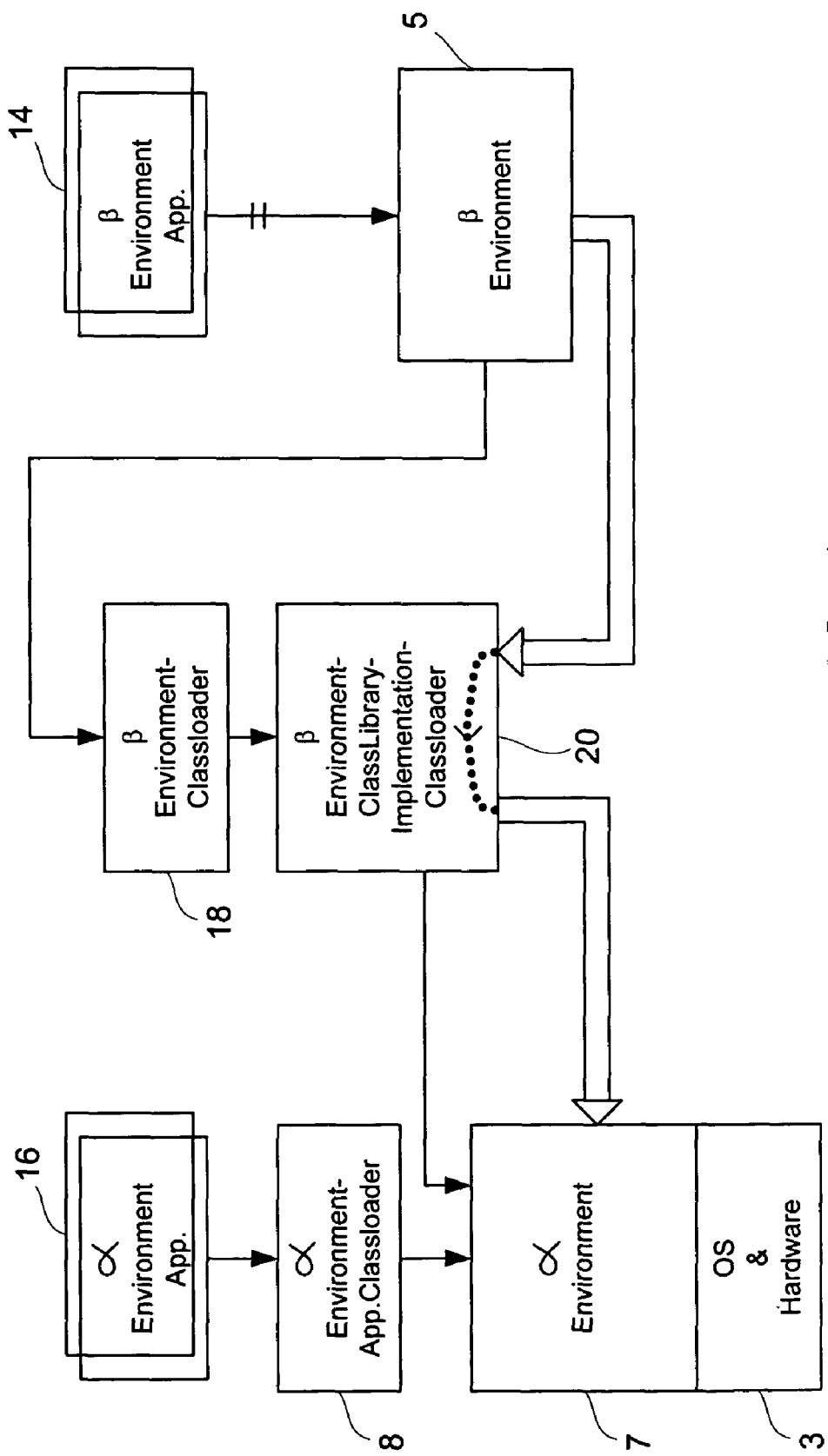
FIG. 2 depicts a simplified block diagram illustrating the integration of a beta environment into the computing device running on the alpha environment, in accordance with another embodiment of the present invention.

Reference is made to the simplified enlarged block diagram shown in FIG. 2 illustrating the integration of the beta environment 5 into the computing device 1 running on the alpha environment 7, in accordance with one embodiment of the present invention. The beta environment application 14 associated with the beta environment 5 is configured to be executed on the computing device 1 with an underlying operating system and hardware component 3 via the mediating components, BetaEnvironmentApplicationClassLoader 18 and BetaEnvironmentClassLibraryIm plementationClassLoader 20.

According to one example, if the request generated by the beta environment application 14 is to load an alpha-only capability, such request for a forbidden capability is filtered by the BetaEnvironmentClassLoader 18 and is rejected. However, if the request generated by the Beta environment application 14 is for a capability existing in beta environment 5 and alpha environment 7, beta environment application 14 is prevented from directly accessing the alpha environment by restricting the accessibility of the beta environment application 14 to the capabilities of the beta environment, only. By way of example, and as will be discussed in more detail below, the alpha environment-only capability can be a class defined solely in the alpha environment. An example of restricting access to the beta environment capability can be when the alpha environment includes additional members or additional byte codes of a member. However, as the capability of the beta environment is limited and the beta environment does not support the additional members or the additional byte codes of the member, the Beta environment application 14 is denied access to the requested capabilities.

In this manner, while the beta environment application 14 is not aware of the underlying more capable alpha environment and is incapable of accessing the alpha environment directly, the hybrid system of the present invention implementing the mediating BetaEnvironmentApplicationClassLoader 18 and BetaEnvironmentClassLibrarylmplementationClassLoader 20 can indirectly access the alpha environment 7 and benefit from additional capabilities provided by the alpha environment 7.

Comparatively, the alpha environment application 16 generates a request for a class that is sent to an AlphaEnvironmentClassLoader 8. At this point, the requested class is loaded and the alphaEnvironementAppliation 16 is executed on the alpha environment 7. In this manner, the Alpha environment application 16 is run by the associated alpha environment 7 without the Alpha environment application 16 having any knowledge of the existence of the isolated and co-existing beta environment 5.

According to one embodiment of the present invention, the request issued by the beta environment application 14 may result in the beta environment 5 needing to access or refer to an alpha-only environment capability (e.g., class, methods, fields, etc.) not provided in the beta environment (as opposed to the beta environment application 14 referring to the alpha environment-only capability, directly). By way of example, the beta environment 7 can generate a request for a class in beta environment 5, which in turn, refers to a class that is part of the alpha environment 5 but not the beta environment 5. In such a scenario, the request is dispatched to the BetaEnvironmentClassLibrarylmplementationClassLoader 20 for processing subsequent to which the result is sent to the alpha environment 7.

One of ordinary skill in the art must appreciate that the hybrid system of the present invention can be used wherein any number of beta environments can co-exist on a computing device 1 with the alpha environment 7 so long as each pair of the alpha and beta environment is related yet distinct. Exemplary pairs of related but distinct alpha and beta environments can be J2SE and CDC and the foundation profile, J2SE and CLDC and MIDP, J2EE, and CDC and the foundation profile, etc.

Furthermore, it must be noted that while alpha and beta environments co-exist on the computing device, when the computing device is certified as compliant with the alpha environment, the computing device is configured to be compliant with the alpha environment. In the same manner, if the computing device is certified as compliant with the beta environment, the computing device is configured to be almost completely compliant with the beta environment.

Yet further, it must be noted that while a request issued by the beta environment application 14 to directly access a capability in the alpha environment 7 is denied, the request issued by the Beta environment application 14 may be processed by the environment beta 5, accessing the environment alpha environment 7 via the BetaEnvironmentClassLibrarylmplementationClassLoader 20. In short, the request issued by the beta environment application 14 can be processed, indirectly, as the hybrid system of the present invention enables sharing of implementation between the Beta environment application 14 and the alpha environment 7.

Figure 3:
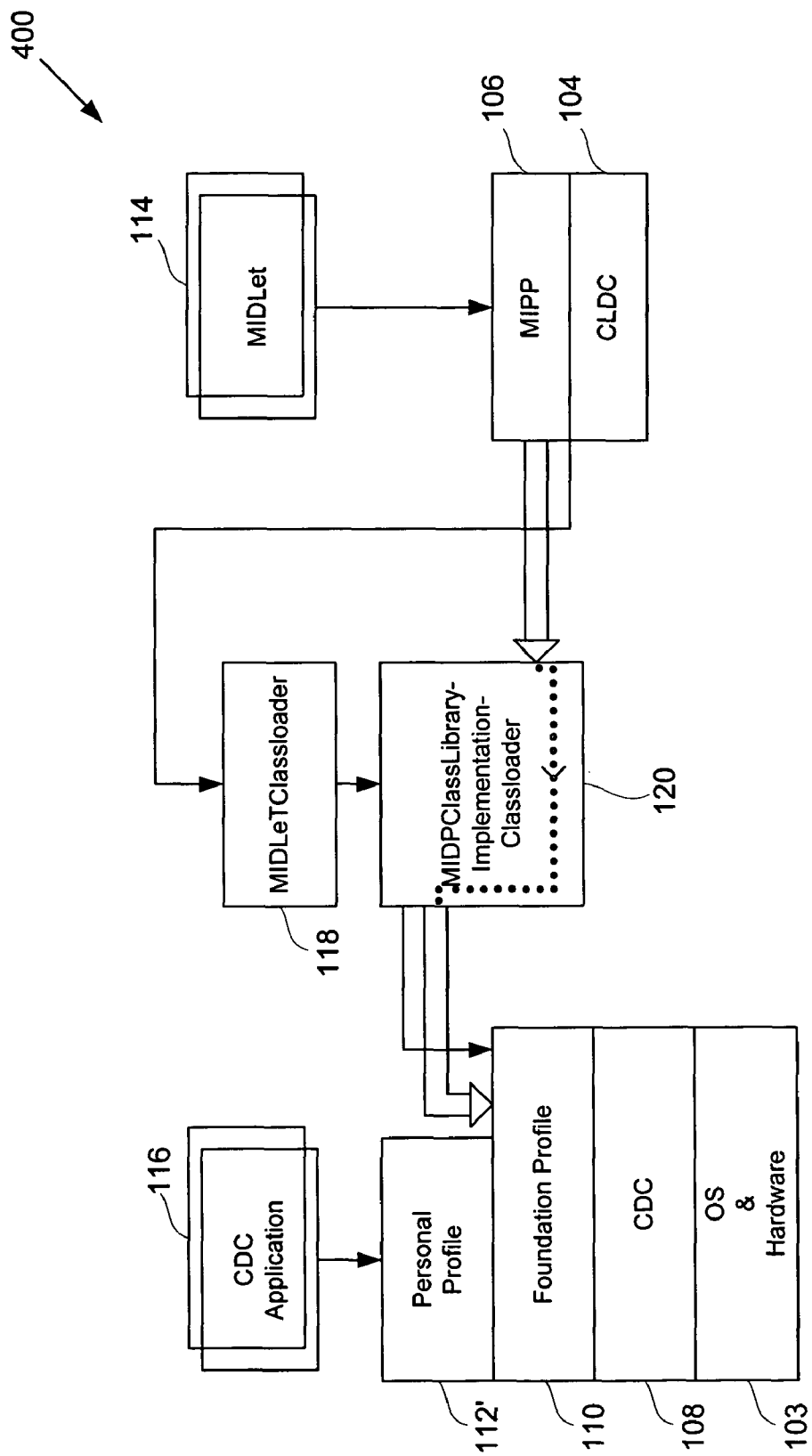
FIG. 3 depicts a simplified block diagram illustrating using of the hybrid system of the present invention wherein the MIDP has been added to an exemplary computing device running on CDC, in accordance with still another embodiment of the present invention.

Utilizing the hybrid system of the present invention wherein the MIDP 106 (i.e., a less capable environment) has been added to the computing device 400 running on CDC 108 (i.e., the more capable environment) is illustrated in the simplified enlarged block diagram depicted in FIG. 3, in accordance with one embodiment of the present invention. The CDC 108 runs on top of the operating system and hardware 103. A foundation profile 110 runs on top of the CDC 108 and a personal profile 112' runs on top of the foundation profile 110. A CDC application 116 is shown to run on top of the personal profile 112'.

As explained in more detail above, the CLDC 104 is a configuration in J2ME architecture which includes the JVM and the core set of libraries while the CDC 108 is a configuration in J2ME that includes JVM and the respective core set of libraries. However, the core set of libraries in the CDC 108 is more similar to the core set of libraries in J2SE, and thus is broader. By way of example, the exemplary computing device 400' including the CDC 104 can access all of the J2SE networking protocols, input/output facilities, service libraries, etc. while the scope of the CLDC 104 may be limited. For example, the CLDC 104 can access a subset of CDC core classes and functionality, a subset of CDC networking protocols, etc. In one embodiment, the CLDC can access the class java.lang.String. However, not all the methods available in the CDC are available to CLDC. Furthermore, while the CLDC can also access the network, the CLDC specification does not include any specific protocols.

In accordance to one example, the MIDP 106 and CLDC 104 can be added to the computing device 400 wherein CDC 108 is the underlying platform. In this manner, a MIDlet 114 running on top of the MIDP 106 and CLDC 104 is given the illusion of being processed by the CDC 108. Furthermore, through the MIDletClassLoader 118 and MIDPClassLibrarylmplementationClassLoader, the MIDlet 114 can be processed indirectly on the CDC 108, thus allowing the MIDlet 114 utilize the additional capabilities of the CDC 108. In one embodiment of the present invention, the MIDletClassLoader 118 is instantiated for each downloaded MIDlet.

According to yet another embodiment, the MIDlet 114 is given the capability to indirectly reference a class of the CDC 108 not existing in the MIDP 106. In one embodiment, the MIDlet 114 can indirectly access a CDC-only object in the CDC 108 when the CDC-only object is referenced by the MIDP 106 as opposed to the MIDlet 114. Under such circumstances, the MIDP 106 can use the extra capabilities of the CDC 108 through the MIDPClassLibrarylmplementationClassLoader 120.

By implementing the hybrid system of the present invention, the computing device 400 having the CDC 108 environment can further provide additional features provided by the MIDP 106 yet not supported by the CDC 108. In one embodiment, each of the isolated yet co-existing MIDP 106 and CDC 108 is given the illusion of being the sole environment running on the computing device 400, while the MIDP 106 and the CDC 108 may share implementation. For instance, in one example, code sharing is enabled between the MIDPApplicationlmplementationLibrary and the CDC library.

In accordance with one example, the CLDC 104 is a subset of the CDC 108 and the foundation profile 110. As such, the CLDC 104 is less capable than the CDC 108 and the foundation profile 110. However, in one example, the MIDP 106 can add extra capabilities to the CLDC 104, which may be available to the CDC 108, foundation profile 110, or the personal profile 112'. Such additional capabilities (e.g., APIs, etc.) can be implemented in Java using the capabilities of the CDC 108. However, in one example, the native software code (e.g., C language) may be used. The native software code can be designed to use the capability of the CDC 108 to call the native software code. However, the native software code may not be a part of the MIDP 106.

Figure 4:
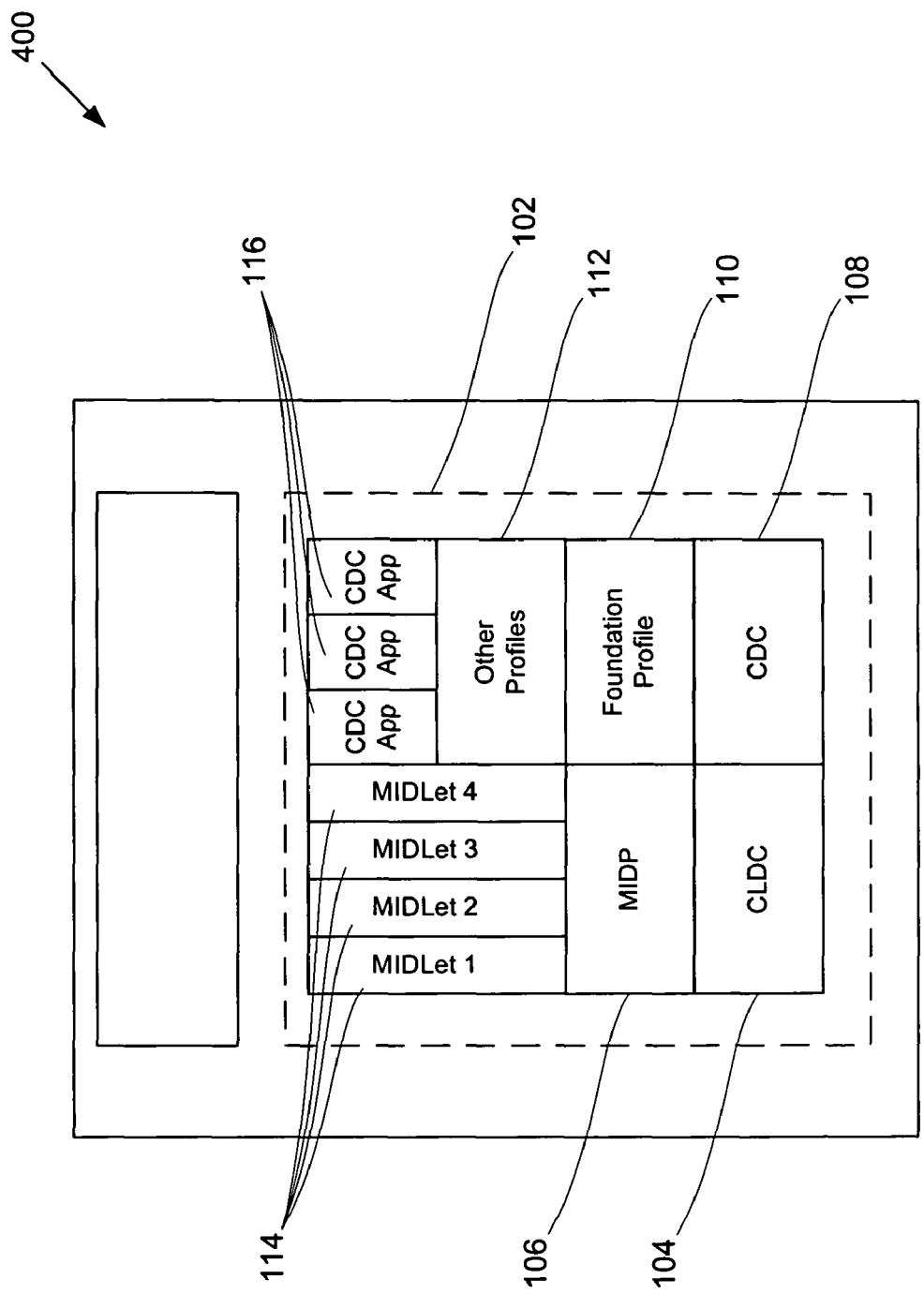
FIG. 4 depicts a simplified block diagram of a mobile device implementing the hybrid system of the present invention, in accordance with yet another embodiment of the present invention.

An exemplary computing device implementing the hybrid system of the present invention can be a mobile device 400' shown in the simplified block diagram of FIG. 4, in accordance with one embodiment of the present invention. Two separate, yet related environments, the CLDC 104 and CDC 108 co-exist in a storage 102 of the computing device 100. A plurality of MIDlets 114 sits on top of the MIDP 106, which in turn, sits on top of the CLDC 104.

By implementing the hybrid system of the present invention, each of the MIDlets 114 can be run under the illusion that the MIDlet 114 is running on the computing device 400' running MIDP/CLDC, while preventing the plurality of MIDlets 114 from accessing the CDC 108, directly. In reality, however, the plurality of MIDlets 114 can be processed on the computing device 400' such that the additional capabilities of the CDC 108 can be utilized, indirectly. In this manner, at the same time, not only the computing device 400' can perform the standard functions, as expected, but also computing device 400' is capable of running more complicated applications typically run on the CDC 108.

Similarly, the CDC applications 116 are run on top of the CDC 108, as the CDC applications are denied access to the MIDP 106 and CLDC 104. That is, the CDC applications 116 are given the illusion that the underlying environment is the CDC 108, and that MIDP 106 and CLDC 104 do not reside on the computing device 400'. Consequently, a compatibility environment is provided between a commonly used less capable environment MIDP/CLDC and the more complex CDC 108 while CDC applications 116 are also present and running on top of the CDC 108.

In accordance with one embodiment, running the MIDP 106 on top of the CVM/CDC 108 can be divided into at least three components. The first component can be a MIDP control program configured to be responsible for invoking the MIDlets and managing the MIDlets "lifecycles." The MIDP control can program interact with the MIDlet by way of a set of methods which, in one example, are part of the MIDlet class. Some of such methods are configured to be implemented by the MIDlet and are called by the control program to direct the behavior of the MIDlet (e.g., startApp to start up the MIDlet, destroyApp to shut down the MIDlet, etc.). Other methods can further be implemented by the MIDP control program and can be called by the MIDlet (e.g., notifyPaused to announce that the MIDlet does not want to be run until further notice, etc.).

Table 1 below, includes an exemplary MIDlet Runner computer code which can be implemented as a main software program installing other programs in an exemplary hybrid system of the present invention.

TABLE 1

Exemplary Code for MIDletRunner.Java

```java
import sun.misc.MIDletClassLoader;
import java.net.URL;
import sun.misc.MemberFilter;
import java.security.AccessController;
import java.security.AccessControlContext;
import java.security.PrivilegedAction;
class MIDletRunner{
    static String systemPackages[ ] = {
        "java.lang.",
        "java.io.",
        "java.util.",
        "javax.microedition."
    };
    static String permittedSystemClasses[ ] = {
        "java.lang.Runnable",
        "java.lang.Character",
        "java.lang.Class",
        "java.lang.Object",
        "java.lang.Runtime",
        "java.lang.String",
        "java.lang.StringBuffer",
        "java.lang.System",
        "java.lang.Throwable",
        "java.lang.Exception",
        "java.lang.Error",
        "java.io.PrintStream",
    };
    static private class memberAmputator{
        String className;
        String permittedFields[ ];
        String permittedMethods[ ];
        memberAmputator( String name, String fields[ ], String methods[ ] ){
            className = name;
            permittedFields = fields;
            permittedMethods = methods;
        }
    };
    private static memberAmputator permittedMembers[ ] = {
        new memberAmputator(
            "java.lang.System",
            new String[ ] {
                "err:Ljava/io/PrintStream;",
```

TABLE 1-continued

Exemplary Code for MIDletRunner.Java

```
                "out:Ljava/io/PrintStream;"
        },
        new String[ ] {
            "arraycopy:(Ljava/lang/Object;ILjava/lang/Object;II)V",
            "currentTimeMillis:( )J",
            "gc:( )V",
            "exit:(I)V",
            "getProperty:(Ljava/lang/String;)Ljava/lang/String;",
            "identityHashCode:(Ljava/lang/Object;)I"
        }
    ),
    new memberAmputator(
        "java.lang.Class",
        new String[0], // no fields
        new String[ ] {
            "forName:(Ljava/lang/String;)Ljava/lang/Class;",
            "getName:( )Ljava/lang/String;",
            "getResourceAsStream:(Ljava/lang/String;)Ljava/io/ImputStream;",
            "isArray:( )Z",
            "isAssignableFrom:(Ljava/lang/Class;)Z",
            "isInstance:(Ljava/lang/Object;)Z",
            "isInterface:( )Z",
            "newInstance:( )Ljava/lang/Object;",
            "toString:( )Ljava/lang/String;"
        }
    )
};
static MemberFilter mf;
static AccessControlContext ac;
static void
initMemberFilter( ){
    mf = new MemberFilter( );
    for (int i = 0; i < permittedMembers.length; i++){
        mf.addRestrictions(permittedMembers[i].className,
                permittedMembers[i].permittedFields,
                permittedMembers[i].permittedMethods);
    }
    mf.doneAddingRestrictions( );
}
ThreadGroup     targetThreadGroup;
Thread      targetThread;
String      targetClassname;
SecurityManager     targetSecurityManager;
String      MIDPath;
String      classname;
MIDletRunner(String path, String thisClassname){
    MIDPath = path;
    classname = thisClassname;
}
public Thread runMIDlet( )
{
    URL midJarURL;
    MIDletClassLoader myClassLoader;
    Class targetClass;
    System.out.println("Running class "+classname+" in path "+MIDPath);
    targetClassname = classname;
    try {
        midJarURL = new URL("jar:"+MIDPath);
    }catch(Exception e){
        System.err.println("URL Creation:");
        e.printStackTrace( );
        return null;
    }
    myClassLoader = new MIDletClassLoader(midJarURL, systemPackages,
                permittedSystemClasses, mf);
    try {
        targetClass = myClassLoader.loadClass(classname, true);
    } catch (Exception e){
        System.err.println("Class lookup:");
        e.printStackTrace( );
        return null;
    }
    targetThreadGroup = new ThreadGroup("MIDlet "+classname);
    try{
        targetThread = new Thread(targetThreadGroup,
                (Runnable)(targetClass.newInstance( )));
        targetThread.start( );
    }catch(Exception e){
```

TABLE 1-continued

Exemplary Code for MIDletRunner.Java

```
                System.err.println("Thread create/start/join:");
                e.printStackTrace( );
                return null;
            }
            return targetThread;
    }
    public static void main( String args [ ] ){
        String MIDPath = args[0];
        MIDletRunner runner[ ] = new MIDletRunner[args.length-1];
        Thread thread[ ] = new Thread[args.length-1];
        ac = AccessController.getContext( );
        initMemberFilter( );
        // run the MIDlets
        for (int i=1; i<args.length; i++){
            MIDletRunner thisRunner = new MIDletRunner(MIDPath, args[i]);
            runner[i-1] = thisRunner;
            thread[i-1] = thisRunner.runMIDlet( );
        }
        // wait for them all to terminate
        for (int i=0; i<thread.length; i++){
            try {
                // this should probably be priv'd too!!
                if (thread[i] != null )
                    thread[i].join( );
            }catch (Exception e){
                System.err.println("While waiting on "+runner[i].targetClassname);
                e.printStackTrace( );
                continue;
            }
            System.out.println("MIDlet "+runner[i].targetClassname+" terminated");
        }
    }
}
```

The second component is building the classloader MIDP/CLDC class implementation on top of the selected platform, i.e., CDC 108. In another embodiment, implementing the class MIDlet can be included. The last component includes modifications to be made to the underlying platform so as to make the underlying platform conform to the CLDC specification. In one instance, modifications to the underlying platform may include loading of MIDP implementation classes either by the system ClassLoader or by another ClassLoader, thus providing access to almost the entire underlying platform.

When implementing the hybrid system of the present invention to create a hybrid system of environments between the CLDC 104 and the MIDP 106 and the CDC 108, particular situations may need to be addressed. Below are brief explanations of each scenario and the respective applicable resolutions.

A. Hiding CDC from Midlets
1. Missing Class

As previously stated, different environments can have different capabilities. By way of example, while certain classes may exist in both alpha and beta environments, the beta environment may lack a number of classes (i.e., capabilities) that solely exist in the alpha environment. In the exemplary hybrid system shown in FIG. 5 wherein the CLDC 104 and CDC 108 co-exist on the same computing device 400', the CDLC 104 may lack a number of classes of the CDC 108. For instance, while the CDC 108 includes the class "java.util.HashMaP," the CLDC 104 lacks such class. Accordingly, the hybrid system of the present invention causes the MIDlet 114a request to directly access the "java.util.HashMaP" (i.e., the CDC-only class) be denied. However, such class can be indirectly accessed by the MIDP 106 referencing the class using the assistance of the MIDPClassLibraryImplementationClassLoader 120, the user-defined classloaders.

Figure 5:
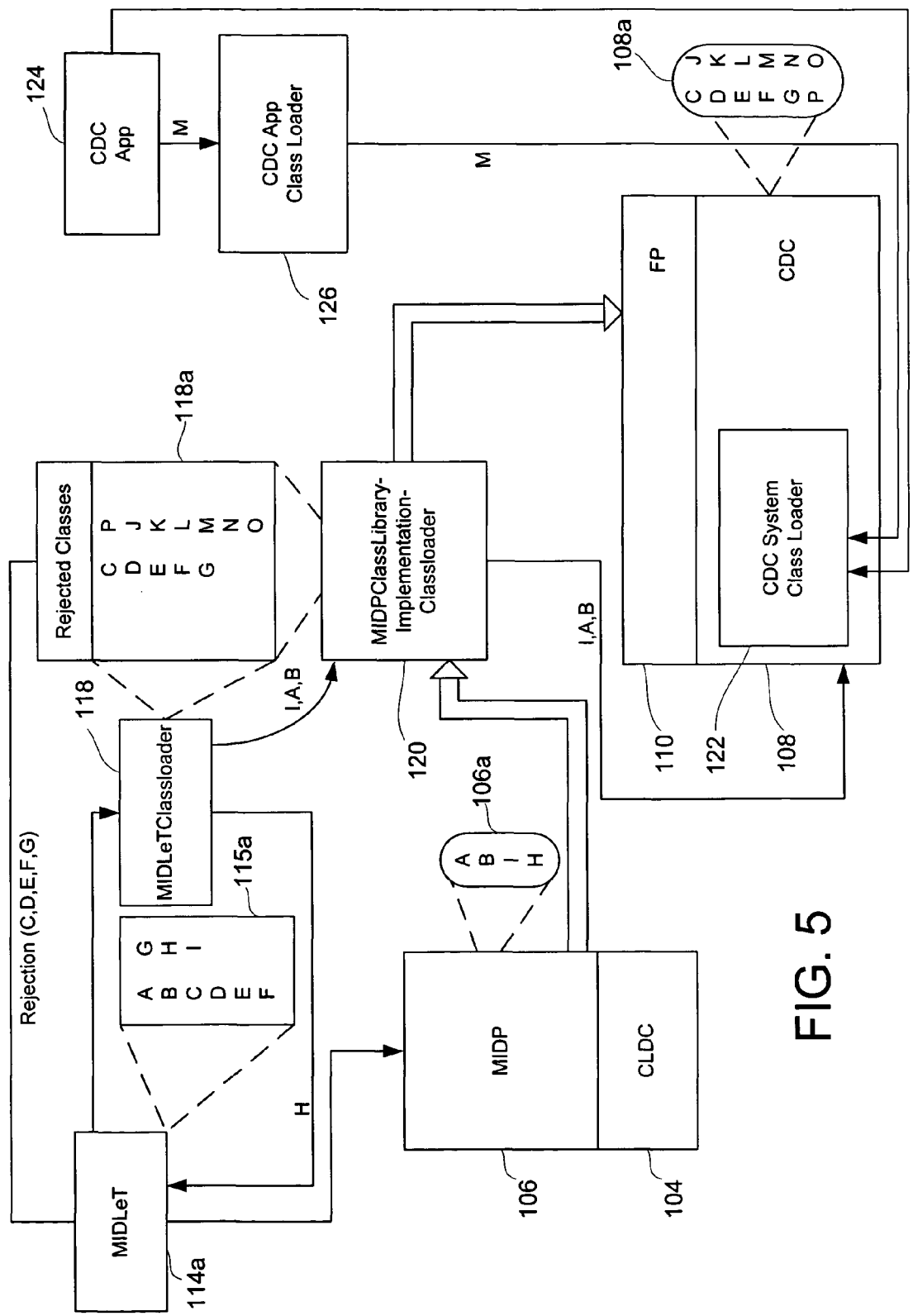
FIG. 5 shows a simplified block diagram demonstrating the exemplary hybrid system shown in FIG. 4 further illustrating the capability of the embodiments of the present invention to bar MIDlets from directly accessing a CDC-only class, in accordance with still another embodiment of the present invention.
Figure 6:
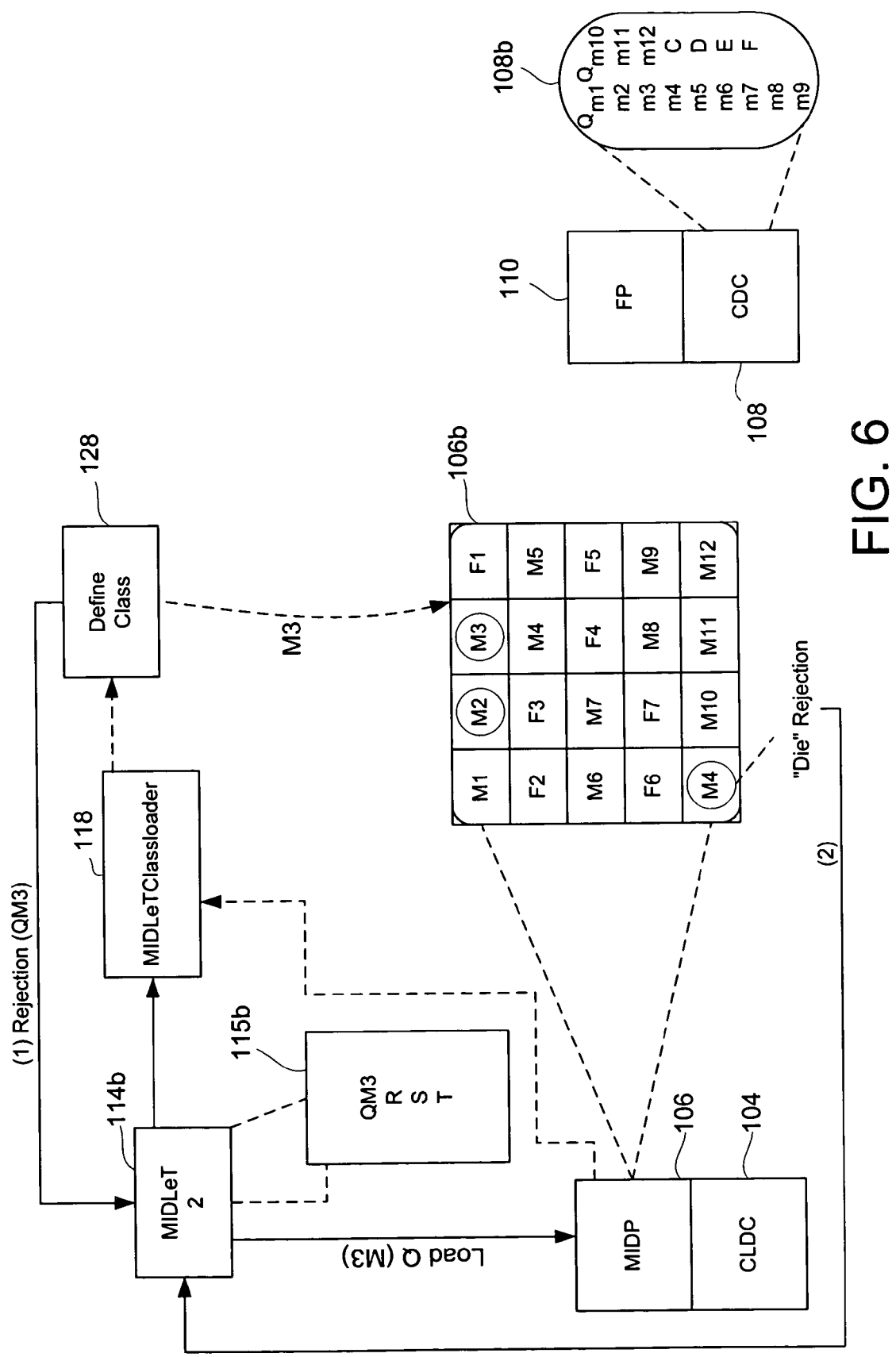
FIG. 6 depicts a simplified block diagram illustrating the hybrid system of the present invention handling a request of a MIDlet for missing members of a class included in both, CDC and MIDP, in accordance with yet another embodiment of the invention.

By way of example, the hybrid system of the present invention prevents a MIDlet 114a from directly accessing CDC-only classes, as shown in the simplified enlarged block diagram depicted in FIG. 5, in accordance with one embodiment of the present invention. The MIDlet 114a includes a plurality of classes A-I 115a, and is configured to run on top of the MIDP 106 and CLDC co-existing with the CDC 108. A CDC application 124 is to run on top of the foundation profile 110 and CDC 108. The CDC 108 has a plurality of classes C-G and J-P in the CDC class library 108a.

According to one example, user-defined class loaders MIDPClassLibraryImplementationClassLoader 120, MIDletClassLoader 118 are instantiated as part of setting up the MIDP, the CDC System ClassLoader 122 is instantiated at system start up, and the CDCApplicationClassLoader 126 is instantiated as part of setting up the CDC. Once the MIDlet 114a is initiated, a request is issued to the classloader MIDletClassLoader 118 to load a class. In one embodiment, MIDletClassLoader 118 is configured to maintain isolation between the CLDC 104 and CDC 108, the co-existing environments by, for example, using a filter. In the illustrated embodiment, the MIDletClassLoader 118 is capable of handling the request issued by the MIDlet 114a for the class H. As such, the class H is loaded. However, the MIDletClassLoader 118 is incapable of loading classes I, A, and B. Hence, the request to load the classes I, A, and B is sent to the MIDPClassLibraryImplementationClassLoader 120, the parent of the MIDletClassLoader 118, to be processed.

In the illustrated embodiment, the MIDPClassLibraryImplementationClassLoader 120 is also incapable of processing the issued request. As such, the request is conveyed to a CDC System ClassLoader 122, the parent of the MIDPClassLibraryImplementationClassLoader 120. As shown, the MIDP class library 106a is loaded by the MIDP- ClassLibraryImplementationClassLoader 120. It must further be noted that in one example, multiple levels of classloaders may exist.

According to one embodiment, the MIDletClassLoader 118 can be instantiated for each downloaded MIDlet 114*a-d*. In this manner, all class requests from the MIDlets 114*a-d* are configured to be handled by the corresponding classloader MIDletClassLoader 118. In this fashion, the MIDlet 114*a* request for CDC-only classes is rejected and the MIDlet 114*a* is denied direct access to the CDC-only classes. By way of example, the request can be rejected either by rewriting the member access, or rewriting the constant pool entry thus providing a "lazy rejection." Alternatively, an exception can be instigated substantially instantaneously.

Comparatively, the request for a class, as issued by the CDC application 124 is delivered to the CDCApplicationClassLoader 126 for processing. At this point, however, if the CDCApplicationClassLoader 126 is incapable of handling the request, the request is sent to the CDC System ClassLoader 122 for processing. As can be seen, the CDCApplicationClassLoader 126 and the MIDPClassLibraryImplementationClassLoader 120 have a common parent, CDC System ClassLoader 122.

In the embodiment shown in FIG. 5, while classes A-I 115*a* are included and referenced by the MIDlet 114*a*, merely classes A, B, I, and H are in the MIDP class library 106*a* and thus included in the MIDP 106 environment. As such, merely classes A, B, I, and H in MIDP class library 106*a* can be directly accessed by the MIDlet 114*a*. Certain classes referenced by the MIDlet 114*a* are CDC-only classes as shown in the CDC class library 108*a* and are included in the CDC 108. As a result, CDC-only classes cannot be directly accessed by the MIDlet 114*a*.

According to one example, the hybrid system of present invention implements a filter in the MIDletClassLoader 118 so as to verify whether a class referenced by the MIDlet 114*a* is a CDC-only class. In this manner, a request generated by the MIDlet 114*a* directly referencing any of the rejected classes is denied access, as shown in 118*a*. However, it must be noted that in a different embodiment, the filter can be implemented in any appropriate classloader so long as the function of identifying the CDC-only classes can be achieved (e.g., the MIDPClassLibraryImplementationClassLoader 120, etc.).

Table 2 below includes an exemplary code for the MIDletClassLoader 118. In the illustrated embodiment, a list of rejected classes is begun in the MidletRunnerjava (shown in Table 1), as the array permittedSystemClasses. Thereafter, the list of rejected classes is passed to the MIDletClassLoader constructor (shown in Table 2). In turn, the MIDletClassLoader constructor calls hashAllowedSystemClasses to construct a HashSet allowedClasses. The MIDletClassLoader consults the HashSet allowedClasses in loadFromSystem so that a determination can be made that the reference to the class is allowed. Thus, in one example, the list of rejected classes is passed in when the MIDletClassLoader is instantiated.

TABLE 2

Exemplary Code for MIDletClassLoader.Java

```
/*
 * %W%          %E%
 *
 * Classloader for MIDlets running on CDC/PP
 */
package sun.misc;
import java.net.URL;
import java.net.URLConnection;
import java.io.IOException;
import java.io.InputStream;
import java.util.HashSet;
import java.security.SecureClassLoader;
import java.security.CodeSource;
import java.security.ProtectionDomain;
import java.security.AccessController;
import java.security.AccessControlContext;
import java.security.PrivilegedExceptionAction;
import java.security.cert.Certificate;
public class MIDletClassLoader extends SecureClassLoader {
    URL myBase;
    private String systemPkgs[ ]; /* packages we can ONLY lookup from system */
    private HashSet allowedClasses; /* the classes we can lookup in system */
    private MemberFilter memberChecker; /* to check for amputated members */
    //private CodeSource cs;
    private ProtectionDomain pd;
    private AccessControlContext acc;
    /*
     * Returns the contents of the specified URL as an array of bytes.
     */
    private class URLClassReader implements PrivilegedExceptionAction
    {
        URL url;
        URLClassReader(URL thisURL){
            url = thisURL;
        }
        public Object run( ) {
            try {
                return getBytes( );
            } catch (Exception e){
                return null;
            }
```

TABLE 2-continued

Exemplary Code for MIDletClassLoader.Java

```
    }
    private Object
    getBytes( ) throws IOException{
        URLConnection uc = url.openConnection( );
        if (uc instanceof java.net.HttpURLConnection) {
            java.net.HttpURLConnection huc = (java.net.HttpURLConnection) uc;
            int code = huc.getResponseCode( );
            if (code >= java.net.HttpURLConnection.HTTP_BAD_REQUEST) {
                return null;
            }
        }
        int len = uc.getContentLength( );
        InputStream in = uc.getInputStream( );
        byte[ ] b;
        try{
            if (len != -1) {
                // Read exactly len bytes from the input stream
                b = new byte[len];
                while (len > 0) {
                    int n = in.read(b, b.length - len, len);
                    if (n == -1) {
                        throw new IOException("unexpected EOF");
                    }
                    len -= n;
                }
            } else {
                // Read until end of stream is reached
                b = new byte[1024];
                int total = 0;
                while ((len = in.read(b, total, b.length - total)) != -1) {
                    total += len;
                    if (total >= b.length) {
                        byte[ ] tmp = new byte[total * 2];
                        System.arraycopy(b, 0, tmp, 0, total);
                        b = tmp;
                    }
                }
                    // Trim array to correct size, if necessary
                    if (total != b.length) {
                        byte[ ] tmp = new byte[total];
                        System.arraycopy(b, 0, tmp, 0, total);
                        b = tmp;
                    }
                }
            }catch( IOException e ){
                b = null;
            } finally {
                in.close( );
            }
            return b;
        }
    }
    public MIDletClassLoader(URL base, String systemPkgs[ ],
                             String allowedSystemClasses[ ],
                             MemberFilter mf){
        super(null);
        myBase = base;
        this.systemPkgs = systemPkgs;
        acc = AccessController.getContext( );
        memberChecker = mf;
        pd = new ProtectionDomain(
                new CodeSource(base, new Certificate[0]), null);
        hashAllowedSystemClasses(allowedSystemClasses);
    }
    private void
    hashAllowedSystemClasses(String allowedSystemClasses[ ]){
        HashSet classes = allowedClasses = new HashSet( );
        for (int i = 0; i<allowedSystemClasses.length; i++){
            String classname = allowedSystemClasses[i].intern( );
            classes.add(classname);
        }
    }
    private Class
    loadFromUrl(String classname) throws ClassNotFoundException
    {
        // first ensure we like componentName.
        // it should not have a systemPkg entry as a prefix!
        String forbidden[ ] = systemPkgs;
```

TABLE 2-continued

Exemplary Code for MIDletClassLoader.Java

```
            int fLength = forbidden.length;
            for (int i=0; i< fLength; i++){
                if (classname.startsWith(forbidden[i])){
                    return null; // go look elsewhere.
                }
            }
            // now append ".class" on the end and try to read it.
            String componentName = classname.replace('.','/').concat(".class");
            URLClassReader ucr;
            byte classarray[ ];
            try {
                ucr = new URLClassReader(new URL(myBase, componentName));
                classarray = (byte[ ])AccessController.doPrivileged(ucr, acc);
            }catch(Exception e){
                /*DEBUG*/ e.printStackTrace( );
                return null;
            }
            if (classarray == null )
                return null;
            try {
                Class newClass =
                    defineClass(classname, classarray, 0, classarray.length, pd);
                        // can throw an Error
                memberChecker.checkMemberAccessValidity(newClass); // can throw Error
                return newClass;
            } catch (Exception e){
                throw new ClassNotFoundException(e.getMessage( ));
            }
        }
        private Class
        loadFromSystem(String classname) throws ClassNotFoundException
        {
            // make sure classname is on the list.
            if (!allowedClasses.contains(classname.intern( )))
                return null;
            //return getSystemClassLoader( ).loadClass(classname, false);
            return super.loadClass(classname, false);
        }
        public Class
        loadClass(String classname, boolean resolve) throws ClassNotFoundException
        {
            Class resultClass;
            resultClass = findLoadedClass(classname);
            if (resultClass == null){
                resultClass = loadFromUrl(classname);
                if (resultClass == null){
                    resultClass = loadFromSystem(classname);
                }
            }
            if (resultClass == null)
                throw new ClassNotFoundException(classname);
            if (resolve)
                resolveClass(resultClass);
            return resultClass;
        }
    }
    /*
    InputStream getResourceAsStream(String name)
    */
}
```

In one example, the Member filter shown in Table 3 below can be implemented to process class member references by name and signature as a MIDlet class is being loaded. In this manner, loading of the offending class results in throwing an error. In one instance, the MemberFilter is configured to look at internal CVM data structures. Table 4 below provides an exemplary MemberFilter code in C Language.

TABLE 3

Exemplary Code for MemberFilter.Java

```
package sun.misc;
// probably want this package-visible only when debugged
public class
```

TABLE 3-continued

Exemplary Code for MemberFilter.Java

```
MemberFilter
{
    private int      partialData;
    private int      fullData;
    private String badClass;
    private String badMember;
    private String badSig;
    private native void finalize0( );
    protected void finalize( ){
        finalize0( );
```

TABLE 3-continued

Exemplary Code for MemberFilter.Java

```
        partialData = 0;
        fullData = 0;
}
public MemberFilter( ){}
//
// the name of a class and arrays of all the fields and methods
// -- including type signatures -- which are allowed.
// Separate names from signatures using a colon :
//
public native void
addRestrictions(String classname, String fields[ ], String methods[ ]);
public native void
doneAddingRestrictions( );
private native boolean
    checkMemberAccessValidity0(Class newclass);
public void
    checkMemberAccessValidity(Class newclass) throws Error
{
    if (!checkMemberAccessValidity0(newclass)){
        /* DEBUG */
        throw new Error("Class "+(newclass.getName( ))+" makes
illegal member references to "+badClass+"."+badMember+":"+badSig);
        /* END DEBUG */
        // throw new Error("Class "+(newclass.getName( ))+"
makes illegal member references");
    }
}
```

TABLE 4

Exemplary MemberFilter Code in C Language

```
#include "jni.h"
#include "jvm.h"
#include "javavm/include/classes.h"
#include "javavm/include/interpreter.h"
/*
 * This is the linked-list representation of our internal data
 */
struct linkedClassRestriction {
    struct linkedClassRestriction* next;
    CVMClassTypeID              thisClass;
    int                         nMethods;
    int                         nFields;
    CVMMethodTypeID*            methods;
    CVMFieldTypeID*             fields;
};
/*
 * This is the array-element representation
 */
    typedef struct ClassRestrictionElement {
    CVMClassTypeID      thisClass;
    int                 nMethods;
    int                 nFields;
    CVMUint32*          methods;
    CVMUint32*          fields;
    } ClassRestrictionElement;
typedef struct ClassRestrictions {
    int                 nElements;
    struct ClassRestrictionElement    restriction[1]; /* nElements of them. */
} ClassRestrictions;
static CVMUint32*
parseMemberList(
    JNIEnv* env,
    jarray members,
    int* memberCount,
    CVMUint32 (*lookupFn)(CVMExecEnv*, const CVMUtf8*, const CVMUtf8*))
{
    int nmembers = (*env)->GetArrayLength(env, members);
    int i;
    CVMUint32* memberArray;
    CVMExecEnv* ee = CVMjniEnv2ExecEnv(env);
    *memberCount = nmembers;
    if (nmembers == 0)
        return NULL;
    memberArray = (CVMUint32*)calloc(nmembers, sizeof(CVMUint32));
    for (i=0; i<nmembers; i++){
        jstring designator = (*env)->GetObjectArrayElement(env, members, i);
        /* now get the characters from the string */
        membername = (*env)->GetStringUTFChars(env, designator, &didCopy);
        CVMassert(didCopy); /* hope so because we're going to scribble in it */
        /* find: separator. Replace it with '\0' */
        membersig = strchr(membername, ':');
        CVMassert(membersig != NULL);
        *membersig++ = '\0';
        /* lookup the pair and save the resulting value */
        memberArray[i] = lookupFn(ee, membername, membersig);
        /* release the string characters and the string object */
        (*env)->ReleaseStringUTFChars(env, designator, membername);
        (*env)->DeleteLocalRef(env, designator);
```

TABLE 4-continued

Exemplary MemberFilter Code in C Language

```
        }
        return memberArray;
}
JNIEXPORT void JNICALL
Java_sun_misc_MemberFilter_addRestrictions(
        JNIEnv* env,
        jobject thisObject,
        jstring classname,
        jarray fields,
        jarray methods)
{
        int length;
        const char* classnameString;
        struct linkedClassRestriction* lcrp, *listroot, **nextp;
        jclass thisClass;
        jfieldID partialDataField;
        lcrp = (struct linkedClassRestriction*)calloc(sizeof(struct linkedClassRestriction), 1);
        /* get the typeid of the class */
        length = (*env)->GetStringUTFLength(env, classname);
        classnameString = (*env)->GetStringUTFChars(env, classname, NULL);
        lcrp->thisClass = CVMtypeidNewClassID(CVMjniEnv2ExecEnv(env),
classnameString, length);
        (*env)->ReleaseStringUTFChars(env, classname, classnameString);
        /* allocate the arrays of member typeids */
        lcrp->fields = parseMemberList(env, fields, &(lcrp->nFields),
CVMtypeidNewFieldIDFromNameAndSig);
        lcrp->methods = parseMemberList(env, methods, &(lcrp->nMethods),
CVMtypeidNewMethodIDFromNameAndSig);
        /* insertion sort in linked list based on thisClass value */
        thisClass = (*env)->GetObjectClass(env, thisObject);
        partialDataField = (*env)->GetFieldID(env, thisClass, "partialData", "I");
        listroot = (struct linkedClassRestriction*)((*env)->GetIntField(env, thisObject,
partialDataField));
        nextp = &listroot;
        while(CVM_TRUE){
                if (*nextp == NULL || (*nextp)->thisClass > lcrp->thisClass){
                        lcrp->next = *nextp;
                        *nextp =lcrp;
                        break;
                }
                nextp = &((*nextp)->next);
        }
        (*env)->SetIntField(env, thisObject, partialDataField, (jint)listroot);
}
JNIEXPORT void JNICALL
Java_sun_misc_MemberFilter_doneAddingRestrictions(
        JNIEnv* env,
        jobject thisObject)
{
        /*
         * consolidate linked list into an array for faster access.
         * dispose of linked list form.
         */
        struct linkedClassRestriction* lcrp, *listroot;
        struct ClassRestrictions* crp;
        jclass thisClass;
        jfieldID partialDataField;
        jfieldID fullDataField;
        int     nentries;
        int     i;
        thisClass = (*env)->GetObjectClass(env, thisObject);
        partialDataField = (*env)->GetFieldID(env, thisClass, "partialData", "I");
        fullDataField = (*env)->GetFieldID(env, thisClass, "fullData", "I");
        listroot = (struct linkedClassRestriction*)((*env)->GetIntField(env, thisObject,
partialDataField));
        /* count */
        for (nentries=0, lcrp=listroot; lcrp!=NULL; lcrp = lcrp->next)
                nentries += 1;
        /* allocate */
        crp = (struct ClassRestrictions*)calloc(1,
                        sizeof(struct ClassRestrictions)
                        + (nentries-1)*sizeof(struct ClassRestrictionElement ));
        /* copy */
        crp->nElements = nentries;
        for (i=0, lcrp=listroot; inext){
                struct ClassRestrictionElement *creep = &(crp->restriction[i]);
            creep->thisClass = lcrp->thisClass;
                creep->nMethods = lcrp->nMethods;
```

TABLE 4-continued

Exemplary MemberFilter Code in C Language

```c
            creep->nFields = lcrp->nFields;
            creep->methods = lcrp->methods;
            creep->fields = lcrp->fields;
        }
        /* set partialData field to null */
        (*env)->SetIntField(env, thisObject, partialDataField, 0);
        /* set fullData field */
        (*env)->SetIntField(env, thisObject, fullDataField, (jint)crp);
        /* delete linked list elements */
        lcrp = listroot;
        while (lcrp != NULL){
            listroot = lcrp->next;
            free(lcrp);
            lcrp = listroot;
        }
}
/*
 * This is the array-element representation
 */
static ClassRestrictionElement*
lookupClass(ClassRestrictions* crp, CVMClassTypeID cid){
    int i, n;
    ClassRestrictionElement* ep;
    n = crp->nElements;
    ep = &(crp->restriction[0]);
    for (i=0; i<n; i++, ep++) if (ep->thisClass == cid)
            return ep;
    }
    /* not found */
    return NULL;
}
static CVMBool
lookupMember(CVMUint32 mid, CVMUint32* memberArray, int nMembers){
    int i;
    CVMUint32* memberp = memberArray;
    for (i=0; i<nMembers; i++, memberp++){
        if (*memberp == mid) return CVM_TRUE;
    }
    return CVM_FALSE;
}
static void
reportError(JNIEnv* env, jobject thisObject, jclass thisClass,
            char* className, char* memberName, char* type){
    jfieldID fieldID;
    jstring stringObj;
    stringObj = (*env)->NewStringUTF(env, className);
    fieldID = (*env)->GetFieldID(env, thisClass, "badClass", "Ljava/lang/String;");
    (*env)->SetObjectField(env, thisObject, fieldID, stringObj);
    (*env)->DeleteLocalRef(env, stringObj);
    stringObj = (*env)->NewStringUTF(env, memberName);
    fieldID = (*env)->GetFieldID(env, thisClass, "badMember", "Ljava/lang/String;");
    (*env)->SetObjectField(env, thisObject, fieldID, stringObj);
    (*env)->DeleteLocalRef(env, stringObj);
    stringObj = (*env)->NewStringUTF(env, type);
    fieldID = (*env)->GetFieldID(env thisClass, "badSig", "Ljava/lang/String;");
    (*env)->SetObjectField(env, thisObject, fieldID, stringObj);
    (*env)->DeleteLocalRef(env, stringObj);
    free(className);
    free(memberName);
    free(type);
}
JNIEXPORT jboolean JNICALL
Java_sun_misc_MemberFilter_checkMemberAccessValidity0(
    JNIEnv* env,
    jobject thisObject,
    jclass newclass)
{
    ClassRestrictions* crp;
    ClassRestrictionElement* creep;
    jclass thisClass;
    jfieldID fullData;
    CVMClassBlock* cbp;
    jclass classClass;
    jfieldID classBlockPointer;
    CVMInt32           cpCount;
    CVMInt32           i, classIndex, typeIndex;
    CVMClassTypeID     classID;
    CVMMethodTypeID    mID;
    CVMFieldTypeID     fID;
    CVMConstantPool*   cp;
    /*CVMConstantPoolEntry* cpe;*/
    /*CVMConstantPoolEntryType* cpet;*/
    /* get pointer to the classes CVMClassBlock */
    classClass = (*env)->GetObjectClass(env, newclass); // java.lang.Class
    classBlockPointer = (*env)->GetFieldID(env, classClass, "classBlockPointer", "I");
    cbp = (CVMClassBlock*)((*env)->GetIntField(env, newclass, classBlockPointer));
    /* get pointer to our list of restrictions */
    thisClass = (*env)->GetObjectClass(env, thisObject);
```

TABLE 4-continued

Exemplary MemberFilter Code in C Language

```
fullData = (*env)->GetFieldID(env, thisClass, "fullData", "I");
crp = (ClassRestrictions*)((*env)->GetIntField(env, thisObject, fullData));
/* we are now on the inside. Look at the class's constant pool.
 * barf if we don't like what we see.
 */
cpCount = CVMcbConstantPoolCount(cbp);
cp = CVMcbConstantPool(cbp);
for (i=1; i
```

Summarily, in the illustrated embodiment, referenced classes A, B, and I are included in the MIDP class library 106a, and as such, can directly accessed by the MIDlet 114a. However, referenced classes C, D, E, F, G, are only included in the CDC class library 108a, and as such, cannot be accessed by the MIDlet 104a directly. As can be seen, detecting the MIDlet 114a referencing a rejected class 118a, a rejection semantic (e.g., a runtime exception, a failure to load the offending MIDlet class, etc.) is dispatched to the MIDlet 114a indicative of the MIDlet 114a lacking permission to directly access the referenced class.

2. Missing Members:

Certain classes may exist in both alpha and beta environments. However, the beta environment may lack a number of class members (e.g., methods, fields, etc.) present in the alpha environment. Locating class members missing in the MIDP 106 is illustrated in the simplified block diagram shown in FIG. 6, in accordance with one embodiment of the present invention. The MIDlet 2 114b has issued a request referencing classes Q, R, S, and T with the MIDlet 2 114b specifically requesting the execution of a method M3 from class Q. The CDC class library 108b includes methods M1 through M12 of the referenced class Q while MIDP class library 106a lacks method M3 of the class Q. Consequently, the hybrid system of the present invention is configured to deny the MIDlet 2 114b request to directly access the method M3 of the class Q.

In one embodiment, after the class Q is loaded by the MIDletClassLoader 118, the loaded class Q is passed to a DefineClass 128. The DefineClass 128 is a VM internal method configured to determine the file format of the class Q. The DefineClass 128 is further configured to utilize the data in the class file to create a representation of the class Q, as the Class Q is loaded in memory. Once the class Q has been defined and thus can be referenced, the DefineClass 128 is configured to traverse the constant pool 106b of the class Q, as defined in the MIDP 106. The constant pool 106b of the class Q is configured to include the symbolic references of classes, fields, and methods of the class Q. For instance, as illustrated in the embodiment shown in FIG. 6, the class pool 106b can be a table. The DefineClass 128 thereafter traverses the constant pool 106b of the class Q looking for all forbidden members (i.e., methods, fields, and classes not included in the MIDP class library 106a) but included in the CDC class library 108a. In this manner, forbidden members are identified.

According to one embodiment, the VM rejects the MIDlet 2 114a request to execute the method M3 of the class Q by dispatching a rejection semantic to the MIDlet 2 114b upon locating the forbidden member (e.g., method M3 of the class Q). In another example, an exception is dispatched when the forbidden member (e.g., method, field, etc.) is being accessed at run time. In such a situation, a poisoned byte code (e.g., generated by modifying the byte code to one indicating an error) or a poisoned constant pool entry is planted in the constant pool. In the constant pool 106b depicted in the embodiment illustrated in FIG. 6, the forbidden members are methods M2, M3, and M4, as identified by being encapsulated in circles. In one aspect, referring to a poisoned entry can result in throwing an exception (e.g., java.lang.LinkageError, etc.). Furthermore, according to one exemplary embodiment, MIDP/CLDC classes may not be allowed to have finalizers and are prohibited from having a member named finalize( ). For instance, when a request for processing a finalize( ) is issued, such request can be detected at class-load time.

In accordance with one aspect, the CLDC 104 may have a reduced set of errors. In such a scenario, the CLDC specification may allow ambiguity to a certain extent when an error is issued. By way of example, if the JVM instigates a type of error that the CLDC 104 lacks, a type hierarchy can be traveled so as to locate and instigate the closest error existing in the CLDC 104. In still another embodiment, the VM can be cut short when an expectation exists that embedded programs may not sophisticatedly handle errors. For instance, when referencing a field missing in the CLDC 104, the CDC 108 can instigate a NoSuchFieldError. In another example, the CLDC-HI implementation may be able to throw an Error, since NoSuchFieldError, the parent IncompatibleClassChangeError, and the grandparent LinkageError, are not part of the CLDC. In another example, the CLDC Reference Implementation can longjmp to main, thus halting the VM. In a different embodiment, a NoSuchFieldError can be thrown as NoSuchFieldError is an instance of Error. In doing so, however, MIDlet may be allowed to get at NoSuchFieldError Class using getclass( ), and then try to instantiate a new class using newInstance( ). Under such circumstances, instantiating the new class using newInstance( ) can be prevented by throwing an IllegalAccessException.

3. Change Semantics

Certain methods of a class defined in more than one environment may behave differently depending on the calling environment. Referring to the simplified block diagram of FIG. 7, handling a request to execute a method M4 of the class R by a MIDlet 3 114c is illustrated, in accordance with one embodiment of the present invention. The MIDlet 3 114c has requested the execution of the method M4 of the class R depicted to be parts of both the MIDP 106 and CDC 108 environments as defined in the MIDP class library 106c and the CDC class library 108. However, the method M4 of the class R in the MIDP class library 106c exhibits a different behavior than the method M4 of the class R in CDC class library 108c.

Figure 7:
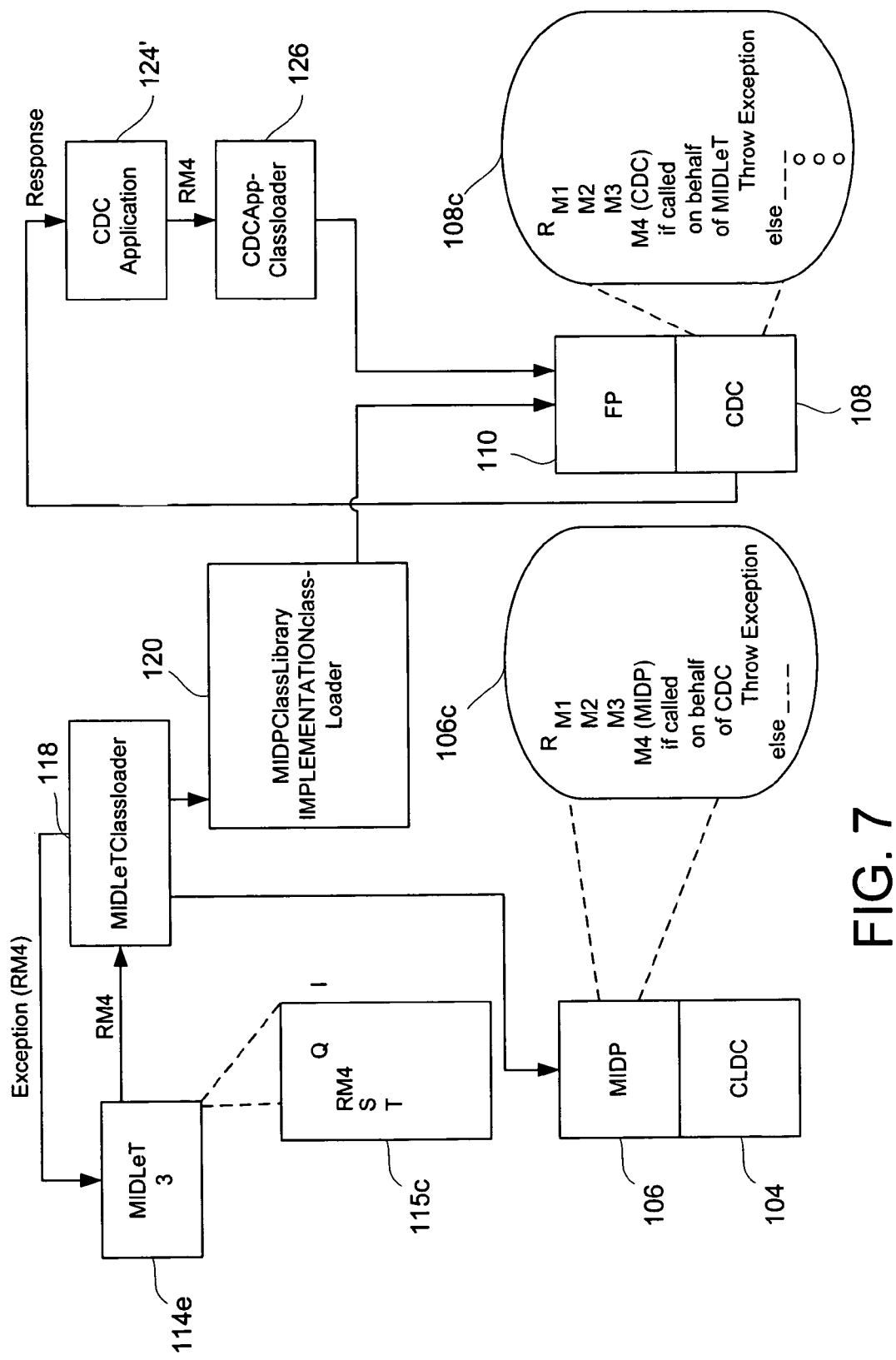
FIG. 7 depicts a simple block diagram illustrating the hybrid system of the present invention identifying and processing a method defined in MIDP and CDC but having different semantics, in accordance with yet another embodiment of the invention.

In the embodiment illustrated in FIG. 7, once the MIDlet 3 114c is initiated, the MIDletClassLoader 118 refers to the MIDP class library 106c so as to determine whether method M4 of class R is defined in the MIDP class library 106c. At this point, an exception is thrown to the MIDlet 3 114c if the requested method M4 of class R is not the same as the method M4 (MIDP) defined in the MIDP class library 106*c*. However, if the requested method M4 of the class R is defined in the MIDP class library 106*c*, the request is handled by the MIDP 106. Thereafter, the result of the request is dispatched to the foundation profile 110 and CDC 108.

In the same manner, the CDC application 124' may issue a request for the execution of the method M4 of the class R. At this point, a determination is made as to whether the requested method M4 of the class R is also included in the CDC 108 and the CDC class library 108*d*. If the method M4 of the class R is the same as the method M4 (CDC) included in the CDC class library 108*c*, the method M4 of the class R is sent to the foundation profile 110 and CDC 108 to be processed.

An exemplary method defined both in MIDP 106 and foundation profile 110 is the method System.getProperty( ). A property is a character string and has a name that is also a character string. In one aspect, System.getProperty( ) takes a string parameter configured to be the name of the property and returns either a string that is a value of the property, or a null pointer if a property having the name does not exist. According to one example, the CDC specification defines the named properties that can be present in the CDC. In the same manner, the MIDP specification provides the named properties that can be present in the MIDP further establishing that almost no other properties are allowed in the MIDP. In one example, the allowable set of properties in the MIDP differs from the allowable set of properties in the CDC set. As a consequence, the method System.getProperty( ) is configured to discover and determine the caller environment running the method. In one embodiment, the method System.getProperty( ) provides different sets of properties available to the caller environment based on the requirements of the caller environment.

According to one embodiment of the present invention, the MIDletClassLoader 118 and an identifier are used to recognize the requester and to identify the origin of the request. With a continued reference to FIG. 7, when the request for execution of the method M4 is generated, the method M4 inquires as to the exact origin of the call. For instance, whether the method M4 is being called on behalf of the MIDletClassLoader 118 or a different ClassLoader, e.g., 126. In one exemplary embodiment, the implementation of the method M4 is modified such that the method M4 can identify the requester, and act accordingly. For instance, the method M4 defined both in the MIDP class library 106*c* and the CDC class library 108*c* can throw an exception in the event the method M4 is called by a MIDlet. A different course of action can be taken if the caller is a CDC application 124'. In short, to accommodate environments having a common member, the implementation of the common member is modified so as to facilitate identifying the origin of the request.

Yet another example of such common member is the method "System.exit( )." For instance, if the System.exit( ) is called by the CDC application 124', the system is configured to halt the process in progress and then exit. Comparatively, if the MIDlet 3 114*c* makes such a request, a security exception is thrown. Accordingly, in an exemplary embodiment wherein n-number of isolated beta environments (i.e., less capable environments) co-exists with an alpha environment (i.e., the most capable environment), the most capable environment is configured to make n-way decisions depending on the beta environment.

4. Class File Restrictions:

Different environments may have different capabilities. For instance, while one environment supports floating-point arithmetic, the others may not. Under such circumstances, the environment incapable of supporting floating-point arithmetic can miss substantially all the byte codes of the Java set of byte codes implementing floating-point arithmetic. As a result, the environment lacking the floating-point byte code can be a subset of the environment including the floating-point byte codes, as the set of byte codes in a parent can include more data. In another exemplary embodiment, one of the environments may be missing the Jump Subroutine (JSR) instructions, Return from Subroutine (RET) instructions, etc.

Figure 8:
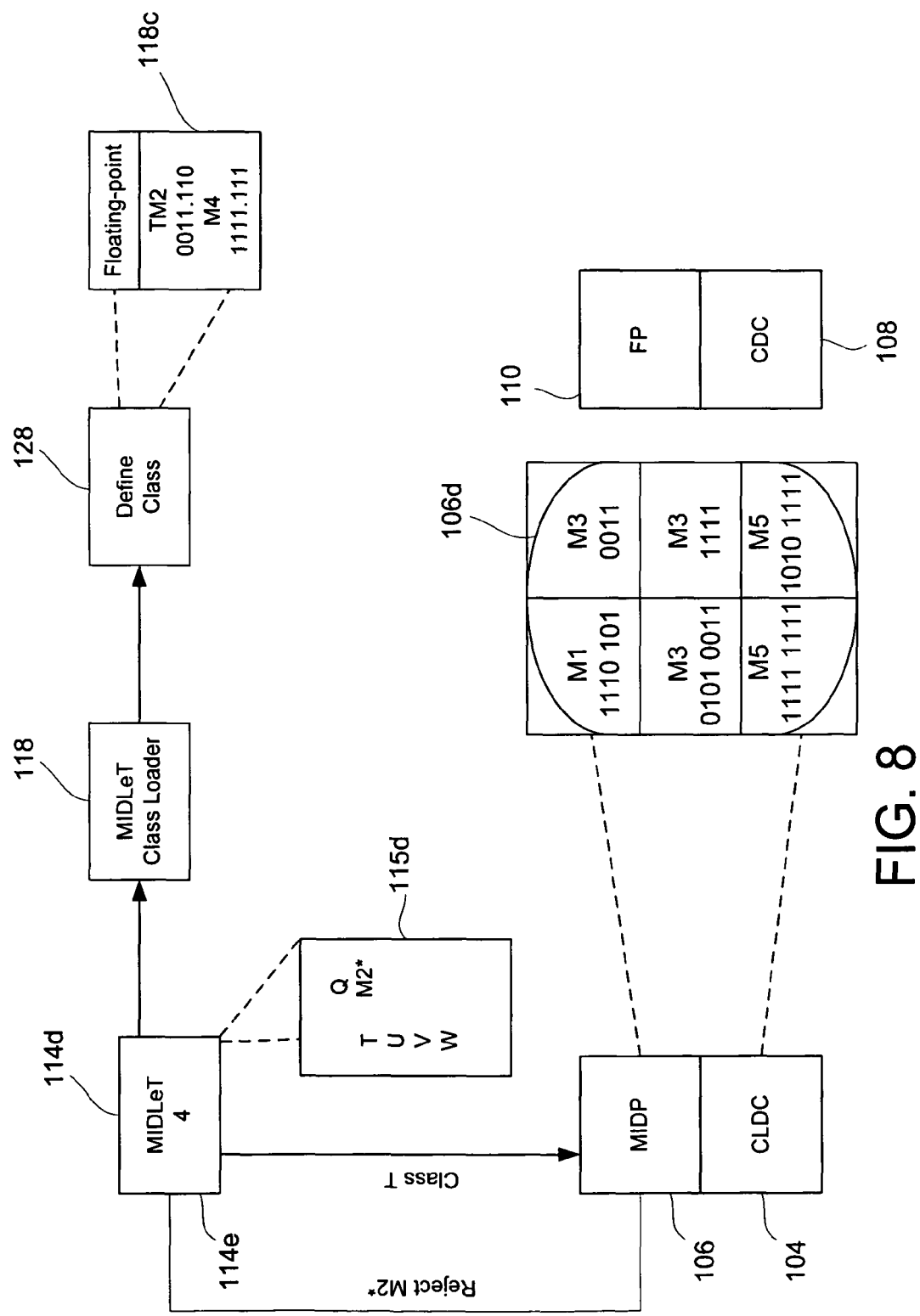
FIG. 8 is a simplified block diagram showing the hybrid system of the present invention identifying missed byte codes of a member included in MIDP and CDC, in accordance with still another embodiment of the invention.

FIG. 8 depicts a simplified block diagram illustrating the hybrid system of the present invention responding to requests for loading a class with a method containing floating-point byte codes, in accordance with one embodiment of the present invention. As can be seen in 115*d*, MIDlet 4 114*d* includes classes Q, T, U, V, and W, with the MIDlet 4 114*d* specifically requesting loading of the class T that includes a method M2 containing floating-point byte codes. In such an embodiment, the MIDlet 114*d* request for loading the class is denied at classloading time, as the method M2 defined in the MIDlet is not allowed to contain floating-point byte codes. In another embodiment, the request for execution of the method M2 of class T which contains floating-points can generate a run-time exception.

The DefineClass 128 traverses the constant pool 106*b* of the class T for forbidden members (i.e., members included in both MIDP 106 and CDC 108) while almost simultaneously traversing the byte codes of each member of the class T scanning for missing byte codes. In this manner, forbidden members as well as respective missing byte codes are located and identified. In one example, such traversing of the constant pool 106*d* and the byte codes can be performed for verification purposes.

According to one embodiment, the VM rejects the MIDlet 4 114*d* request for execution of the missing byte codes by sending a rejection semantic to the MIDlet 4 114*d* upon detecting the missing byte codes. In another example, the exception is instigated when the missing byte codes is being accessed at run time. In such a situation, a poisoned byte code or a byte code indicating an error can replace the missing byte code of the method. In yet another embodiment, as the CLDC 1.0 does not include floating points, finding a floating point opcode in a class file while implementing MIDP2/CLDC1.0 can be grounds for immediate rejection. In another example, rejecting floating point requests can be achieved when loading the class.

B. Hiding MIDP from CDC Applications

In accordance with one embodiment, the hybrid system of the present invention prevents the CDC applications 124 from directly accessing the MIDP 106 and CLDC 104. Referring to the embodiment shown in FIG. 5, CDC applications 124 are sent to the CDCApplicationClassLoader 126 to be loaded. At this point, if the CDCApplicationClassLoader 126 is not capable of processing the request, the request is delegated to the parent, i.e., the CDC System ClassLoader 122. In this manner, the CDC applications 124 bypass the MIDPClassLibraryImplementationClassLoader 120 eliminating the need to reveal to the CDC applications 124 the co-existing MIDP 106 environment.

Figure 9:
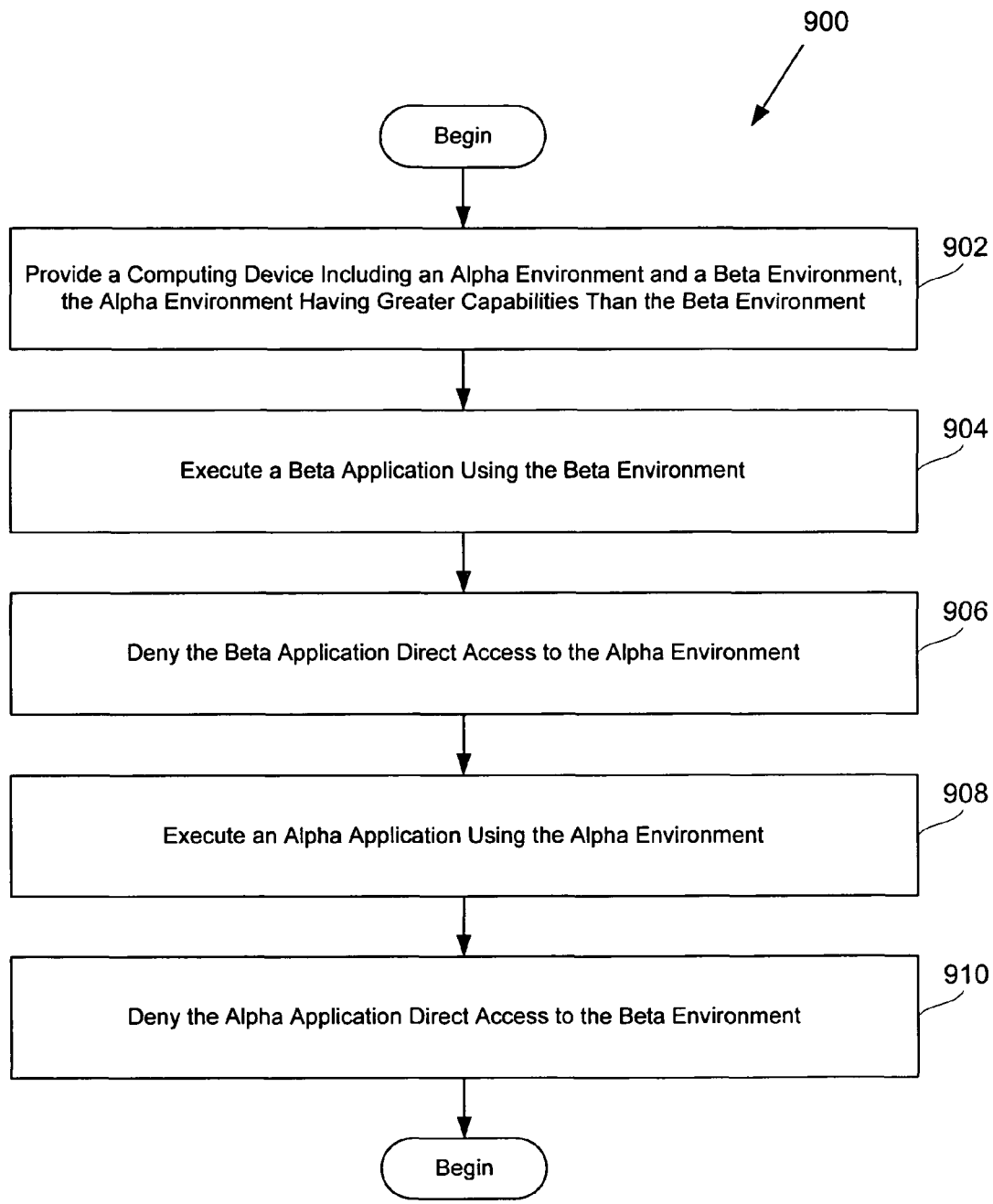
FIG. 9 is a flowchart diagram of method operations performed in an exemplary hybrid system of the present invention, in accordance with yet another embodiment of the present invention.

Reference is made to the flowchart diagram of FIG. 9 depicting the method operations performed in a hybrid system of the present invention, in accordance with one embodiment of the present invention. The method begins with operation 902 in which a computing device including an alpha environment and a beta environment is provided. The alpha environment has greater capabilities than the beta environment. The method then proceeds to operation 904 in which the beta application is executed using the beta environment and then proceeding to operation 906 in which the alpha environment is hidden from the beta application by denying the beta application direct access to the alpha environment, as the beta application is being executed. Next, in operation 906, an alpha application is executed using the alpha environment followed by the operation 908 in which the beta environment is hidden from the alpha application by denying the alpha application direct access to the beta environment so long as the alpha application is being executed. In this manner, the co-existing yet isolated environments can be used so as to enable the beta application from benefiting from additional capabilities of the alpha environment while adhering to the stringent requirements of each of the alpha and beta environments.

Figure 10:
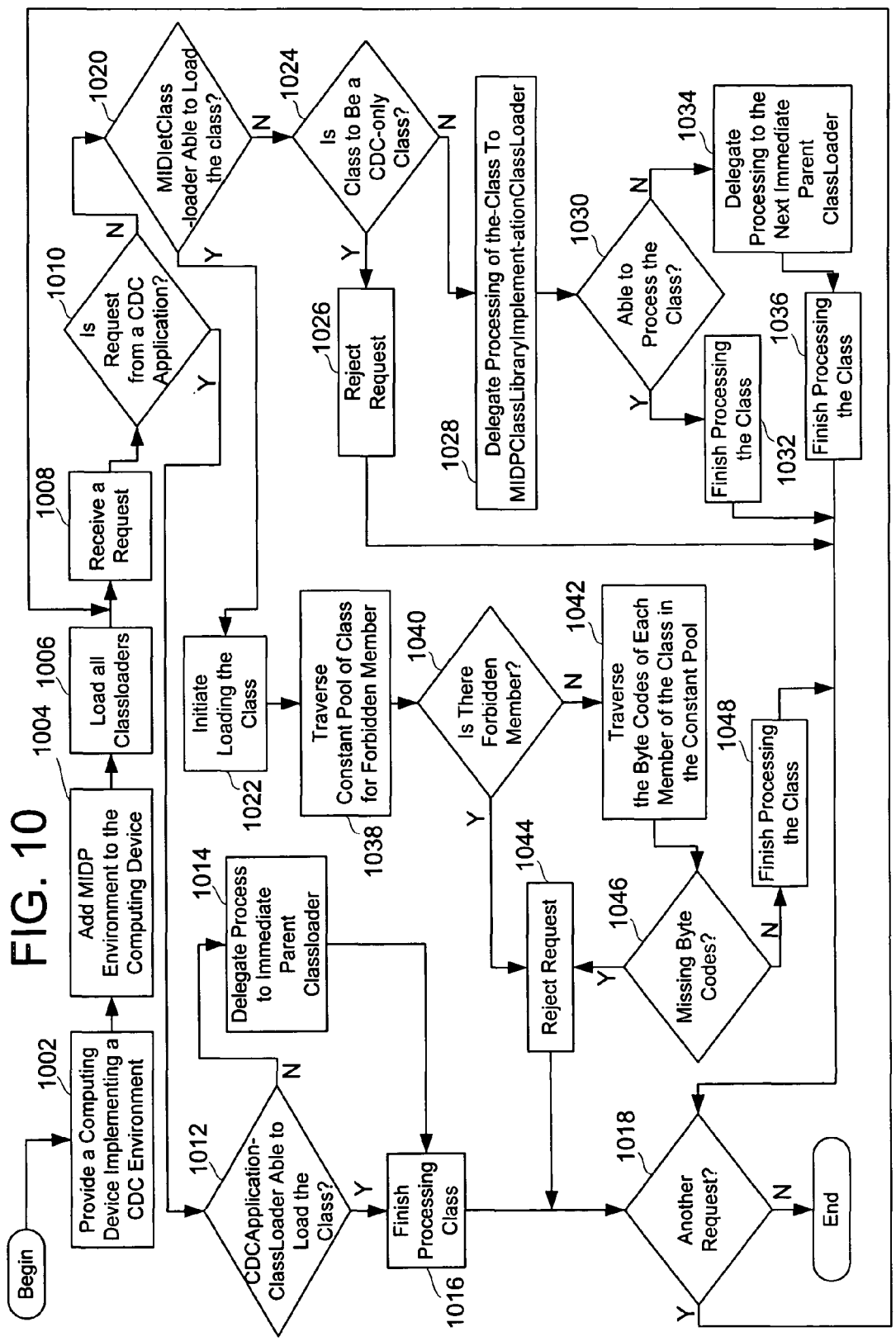
FIG. 10 is a flowchart diagram of method operations performed in a hybrid system wherein the MIDP and CDC environments co-exist on the same computing device, in accordance with still another embodiment of the present invention.

Proceeding to FIG. 10, a flowchart diagram 1000 of method operations performed in a hybrid system wherein the MIDP and CDC environments co-exist on a single computing device is provided, in accordance with one embodiment of the present invention. The method begins in operation 1002 in which a computing device implementing the CDC environment is provided followed by the operation 1004 wherein the MDIP environment is added to the computing device. Next, in operation 1006, all classloaders are instantiated. In one example, the classloaders CDCApplicationClassLoader, CDC System ClassLoader, MIDletClassLoader, and MIDP-ClassLibraryImplementationClassLoader are instantiated. Next, in operation 1008, a request is received to load a class.

In operation 1010, a determination is made as to whether the request is issued by a CDC application. If the request is issued by a CDC application, the method continues to operation 1012 wherein a determination is made as to whether the CDCApplicationClassLoader can load the class. The CDCApplicationClassLoader is a user-defined class loader wherein almost every request for a class of the same CDC application is guided through the same instance of the CDCApplicationClassLoader. In one embodiment, the CDCApplicationClassLoader is configured to load classes form a classpath specified to the CDCApplicationClassLoader at the time the CDCApplicationClassLoader is instantiated. Next, the method continues to operation 1016 wherein a response is generated to the request, if the CDCApplicationClassLoader is capable of processing the request. Thereafter, the method continues to operation 1018 in which a determination is made as to whether another request has been received. If a request has been received, the method continues to operation 1008.

However, if the CDCApplicationClassLoader is not able to process the request in operation 1012, the method continues to operation 1014 wherein processing the request is delegated to the immediate parent classloader, which in one embodiment, is the CDC System ClassLoader. At this point, the immediate parent classloader finishes processing the class in the operation 1016.

If in operation 1010 a determination is made that the request was issued by a MIDlet, the method continues to operation 1020 wherein a determination is made as to whether the MIDletClassLoader is able to load the class. If the MIDletClassLoader is able to load the class, the method continues to operation 1022 in which loading the class is initiated followed by the operation 1038 in which the constant pool of the class is traversed so as to locate forbidden members. In operation 1040, a determination is made as to whether the constant pool includes a forbidden member. Next, the method continues to operation 1044 wherein the request for loading the class is rejected if a forbidden member is located. However, if a forbidden member has not been identified, the method continues to operation 1042 wherein the byte codes of each member of the class in the constant pool is traversed.

Continuing to operation 1046, a determination is made as to whether any missing byte codes have been located. Thereafter, the method continues to operation 1048 if no missing byte codes have been identified, subsequent to which the method continues to operation 1018. However, if any missing byte codes are found in operation 1046, the request for loading the class is rejected in operation 1044.

If the MIDletClassLoader cannot load the class, the method continuous to operation 1024 wherein a determination is made as to whether the class to be loaded is a CDC-only class. In operation 1026, the request to load the CDC-only class is rejected subsequent to which the method continues to operation 1018. However, the method continues to operation 1028 in which processing of the class is delegated to the MIDPClassLibraryImplemenationClassLoader. According to one example, the MIDPClassLibraryImplementationClassLoader receives a request for two reasons. First, the requesting class was previously loaded by the MIDPClassLibraryImplementationClassLoader due to being part of the MIDP implementation. Second, the request to load the class is delegated to the MIDPClassLibraryImplementationClassLoader by the MIDletClassLoader.

In operation 1030 a determination is made as to whether the MIDPClassLibraryImplementationClassLoader is capable of loading the class. Processing the class is completed in operation 1032 if the MIDPClassLibraryImplementationClassLoader is able to process the class. Otherwise, the method continues to operation 1034 wherein processing the class is delegated to the next immediate parent classloader, which in one example, is CDC System ClassLoader. Thereafter, processing the class is finished in operation 1036 followed by the operation 1018.

In this manner, the requests issued by the MIDlet are hidden from the CDC using the MIDletClassLoader and MIDP-ClassLibraryImplementationClassLoader. In the same manner, the requests issued by the CDC applications are only processed by the CDC environment while the MIDlets are processed by the MIDP environment without the CDC applications or MIDlets being aware of the MIDP and CDC co-existing on the same computing device.

The aspects of the present invention are numerous. The hybrid system of the present invention allows a plurality of environments having different levels of capability to co-exist on the same computing device, irrespective of the associated constraints (e.g., lack of sufficient computing power, memory size, secondary storage size, and bandwidth between the computing device and the rest of the world). Furthermore, the hybrid system of the present invention enables a more capable environment to emulate a similar but less capable environment for purposes of program development and/or debugging. Yet further, the hybrid system of the present invention can provide a computing system wherein multiple application execution environments can use a single implementation. Still further, in one embodiment, the more capable and less capable environments can be processed simultaneously on the computing device. Yet further, in another embodiment, more capable and less capable environments may be run at different times. Still further, in the hybrid system of the present invention, hiding less capable environment from the more capable environment can be achieved by using Java 2 mechanisms without making extensive changes to the JVM.

It must be noted that the computing device as used in the present invention can be any type of computing device (e.g., network computers, special purpose computers, and general purpose computers such as desktops, servers, hand-held devices (e.g., embedded mobile devices, PDAs, laptops, Ipods, etc.), microprocessor systems, microprocessor-based or programmable consumer electronics, minicomputers, mainframe computers, etc.). Furthermore, the CDC applications and MIDlets can be of any type and can be obtained from any source in any data acquisition manner.

One must appreciate that generally speaking, the server and the embedded mobile device can communicate using any appropriate communication format (e.g., HyperText Transfer Protocol (HTTP), Linear Network Analysis Package (LNAP), Linear Wireless Application Protocol (LWAP), etc.). Additionally, the communication link between the Internet and the computing device or the servers can be any appropriate communication link (e.g., Open and modular development environment (EDMA) network, global systems for Mobile Communications (GSM) network, cable connection, etc.). Yet further, the computing device and the server can be configured to implement Java programming language. Still further, the MIDlets or CDC applications can be downloaded to any appropriate device data storage (e.g., memory, random access memory (RAM), flash memory, hot disc, mini hot disc, etc.).

Although specific reference may have been made to terminology defined by Sun Microsystems, Inc., it should be understood that any name could be used for such terms, so long as the desired functionality is achieved. For instance, computing device can be any computing device, and can run any operating system. The operating system can support any communication protocol, including protocols for downloading application files. Accordingly, any reference to a particular standard should be viewed only as exemplary and focus should be placed on the claimed functional operation.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended disclosure.

What is claimed is:

1. A system for implementing isolated application execution environments on a computing device, the system comprising:

a virtual machine installed on the computing device, the virtual machine including an instruction set compiled to a processor of the computing device, the virtual machine defined to execute applications through an interpreted language such that the applications need not be compiled to the processor of the computing device;

a first execution environment and a second execution environment both installed on the computing device and both defined to exist within the virtual machine, the first execution environment configured to have greater capabilities than the second execution environment, and wherein the first and second execution environments are defined to execute software applications independently from each other within the virtual machine, wherein each of the first and second execution environments is a respective object-oriented execution environment in which respective hierarchies of classes and methods are defined to provide program execution by the virtual machine when called upon, wherein the first execution environment includes a first class loader for loading classes of the first execution environment within the virtual machine, and wherein the first class loader is only aware of classes associated with the first execution environment, wherein the second execution environment includes a second class loader for loading classes of the second execution environment within the virtual machine, and wherein the second class loader is aware of classes associated with both the first and second execution environments, wherein the second class loader is defined to deny direct access to classes of the first execution environment by any software application being executed within the second execution environment within the virtual machine, and wherein the second class loader is defined to allow indirect access to classes of the first execution environment by authorized software applications executed within the second execution environment within the virtual machine through loading of mediating class within the second execution environment.

2. A hybrid system, the system comprising:

a computing device implementing a virtual machine, the virtual machine including an instruction set compiled to a processor of the computing device, the virtual machine defined to execute applications through an interpreted language such that the applications need not be compiled to the processor of the computing device;

a first application execution environment (AEE) and a second AEE, each of the first AEE and second AEE defined to exist within the virtual machine, the first AEE configured to be isolated from the second AEE, wherein each of the first and second AEEs is a respective object-oriented execution environment in which respective hierarchies of classes and methods are defined to provide program execution by the virtual machine when called upon, wherein the first AEE includes a first class loader for loading classes of the first AEE within the virtual machine, and wherein the first class loader is only aware of classes associated with the first AEE, wherein the second AEE includes a second class loader for loading classes of the second AEE within the virtual machine, and wherein the second class loader is aware of classes associated with both the first and second AEEs, wherein each software application associated with the first AEE is configured to be executed on the first AEE within the virtual machine by accessing classes of the first AEE through the first class loader and is denied direct access to classes of the second AEE by the first class loader, and further wherein each software application associated with the second AEE is configured to be executed on the second AEE within the virtual machine by accessing classes of the second AEE through the second class loader and is denied direct access to classes of the first AEE by the second class loader.

3. A hybrid system as recited in claim 2, wherein a first capability of the classes of the first AEE is configured to be greater than a second capability of the classes of the second AEE.

4. A hybrid system as recited in claim 3, wherein the second AEE is denied direct access to the first AEE by the second class loader rejecting a second AEE request to directly access a class of the first AEE.

5. A hybrid system as recited in claim 3, wherein a first common capability is included in the first capability of the classes of the first AEE, and wherein a second common capability is included in the second capability of the classes of the second AEE.

6. A hybrid system as recited in claim 5, wherein the second AEE is denied direct access to the first AEE by the second class loader operating to reject a second AEE request to directly access an additional element of the first common capability, the additional element of the first common capability not being included in the second common capability.

7. A hybrid system as recited in claim 3, wherein the first capability of the classes of the first AEE is configured to be available to the second software application configured to be executed on the second AEE, such that the second class loader is defined to allow indirect access to the first capability of the classes of the first AEE by the second software application.

8. A hybrid system as recited in claim 3, wherein the first AEE and the second AEE are configured to share an implementation.

9. A system for maintaining a multi-application execution environment, the system comprising:

a computing device implementing a virtual machine, the virtual machine including an instruction set compiled to a processor of the computing device, the virtual machine defined to execute applications through an interpreted language such that the applications need not be compiled to the processor of the computing device;

an alpha environment defined within the virtual machine and configured to have an alpha capability; and a plurality of beta environments each defined within the virtual machine, each beta environment of the plurality of beta environments configured to have an associated beta capability, the alpha environment configured to be isolated from each beta environment of the plurality of beta environments, wherein each of the alpha and beta environments is a respective object-oriented execution environment within the virtual machine in which respective hierarchies of classes and methods are defined to provide program execution by the virtual machine when called upon, wherein the alpha environment includes a first class loader for loading classes of the alpha environment, wherein each beta environment includes an associated beta class loader for loading classes of the associated beta environment, wherein an alpha software application associated with the alpha environment is configured to be executed on the alpha environment within the virtual machine through the alpha class loader, whereby the alpha class loader is defined to deny the alpha software application direct access to classes of each beta environment within the virtual machine, and wherein each beta software application associated with each beta environment is configured to be executed on the associated beta environment within the virtual machine through the associated beta class loader, whereby the associated beta class loader is defined to deny the beta software application direct access to classes of the alpha environment within the virtual machine and to classes of non-associated beta environments within the virtual machine.

10. A multi-environment hybrid system as recited in claim 9, wherein an alpha capability of the alpha environment is configured to be greater than a beta capability associated with each beta environment of the plurality of beta environments.

11. A multi-environment hybrid system as recited in claim 10, wherein each beta environment of the plurality of beta environments is denied direct access to classes of the alpha environment by the associated beta class loader rejecting each beta environment request to directly access classes that provide an alpha environment-only capability.

12. A multi-environment hybrid system as recited in claim 9, wherein the computing device is one of a general-purpose computer, special purpose computer, a network computer, and a mobile device.

13. A method for implementing isolated application execution environments on a computing device, the method comprising:

implementing a virtual machine within the computing device, the virtual machine including an instruction set compiled to a processor of the computing device, the virtual machine defined to execute applications through an interpreted language such that the applications need not be compiled to the processor of the computing device;

implementing a first execution environment and a second execution environment within the virtual machine, the first execution environment configured to have greater capabilities than the second execution environment, and wherein the first and second execution environments are defined to execute software applications within the virtual machine independently from each other, wherein each of the first and second execution environments is a respective object-oriented execution environment in which respective hierarchies of classes and methods are defined to provide program execution by the virtual machine when called upon, wherein the first execution environment includes a first class loader for loading classes of the first execution environment, and wherein the first class loader is only aware of classes associated with the first execution environment, wherein the second execution environment includes a second class loader for loading classes of the second execution environment, and wherein the second class loader is aware of classes associated with both the first and second execution environments;

operating the second class loader to deny direct access to classes of the first execution environment by any software application being executed within the second execution environment within the virtual machine; and operating the second class loader to allow indirect access to classes of the first execution environment by authorized software applications executing within the second execution environment within the virtual machine through loading of a mediating class within the second execution environment.

14. A method as recited in claim 13, further comprising:
initiating execution of a first software application on the first execution environment; and
operating the first class loader to deny the first software application direct access to classes of the second execution environment while the first software application is being executed.

15. A method as recited in claim 13, wherein first capabilities of the first execution environment are configured to be greater than second capabilities of the second execution environment.

16. A method as recited in claim 14, the method further comprising:
sharing a single implementation between the first execution environment and the second execution environment.

17. A method as recited in claim 13, wherein the first execution environment is a Connected Device Configuration (CDC) environment.

18. A method as recited in claim 13, wherein the second execution environment is a Mobile Information Device Profile (MIDP) environment.

19. A method for a Mobile Information Device Profile (MIDP) application execution environment and a Connected Device Configuration (CDC) environment to co-exist on a computing device, the method comprising:
providing the computing device including a virtual machine within the computing device, the virtual machine including an instruction set compiled to a processor of the computing device, the virtual machine defined to execute applications through an interpreted language such that the applications need not be compiled to the processor of the computing device;
providing the MIDP environment and the CDC environment within the virtual machine, the CDC environment configured to have greater capabilities than the MIDP environment;
executing a MIDlet on the MIDP environment within the virtual machine; and
denying the MIDlet direct access to the CDC environment while the MIDlet is being executed,
wherein the MIDP environment is a first set of object-oriented application programming interfaces defined to provide a complete application runtime environment for mobile devices within the virtual machine, and
wherein the CDC environment is a second set of object-oriented application programming interfaces defined to provide a complete application runtime environment for computing devices within the virtual machine, wherein the second set of object-oriented application programming interfaces of the CDC environment is more extensive than the first set of object-oriented application programming interfaces of the MIDP environment.

20. A method as recited in claim 19, further comprising:
executing a CDC application on the CDC environment; and
denying the CDC application direct access to the MIDP environment while the CDC application is being executed.

21. A method as recited in claim 19, wherein the MIDlet is denied direct access to the CDC by rejecting a MIDlet request to load a CDC-only capability.

22. A method as recited in claim 21, wherein the CDC-only capability is a class.

23. A method as recited in claim 19, wherein a MIDP common capability is included in the MIDP and a CDC common capability is included in the CDC.

24. A method as recited in claim 23, wherein the MIDP common capability and the CDC common capability are a common class.

25. A method as recited in claim 24, wherein the MIDlet request to execute a member of the common class not included in the MIDP common class is rejected.

26. A method as recited in claim 25, wherein if the member of the common class requested by the MIDlet includes byte codes forbidden to the MIDlet, loading the request to load the common class is rejected.

27. A method as recited in claim 24, wherein a MIDlet request for a member of the common class is modified if a semantic of the requested member is not equivalent to a semantic of the member as included in the MIDP class.

28. A method as recited in claim 19, wherein capabilities of the CDC environment are configured to be available to the MIDlet being executed on the MIDP environment.

29. A method as recited in claim 19 wherein the MIDP environment and the CDC environment are configured to share an implementation.

30. A method as recited in claim 20, wherein the operation of executing the MIDlet on the MIDP environment includes, issuing a request to load a class; and
loading the class by a classloader for the MIDlet being executed.

31. A method as recited in claim 19, further comprising:
delegating the operation of loading the class to the classloader configured to load the MIDP class library if the classloader for the MIDlet is incapable of loading the class.

32. A method as recited in claim 19, the method further comprising:
sharing a single implementation between the MIDP environment and the CDC environment.

* * * * *